(12) United States Patent
Bouse et al.

(10) Patent No.: US 8,484,241 B2
(45) Date of Patent: Jul. 9, 2013

(54) SYSTEMS AND METHODS TO CONSOLIDATE AND COMMUNICATE USER PROFILES AND MODALITY PREFERENCES INFORMATION FOR CONTENT DELIVERY OR INTERACTION EXPERIENCES

(76) Inventors: Russell Kent Bouse, Lexington, MA (US); Margaret Paradiso Bouse, Lexington, MA (US)

(*) Notice: Subject to any disclaimer, the term of this patent is extended or adjusted under 35 U.S.C. 154(b) by 55 days.

(21) Appl. No.: 13/317,797

(22) Filed: Oct. 29, 2011

(65) Prior Publication Data

US 2012/0109882 A1 May 3, 2012

Related U.S. Application Data

(60) Provisional application No. 61/456,004, filed on Oct. 29, 2010.

(51) Int. Cl.
*G06F 17/30* (2006.01)

(52) U.S. Cl.
USPC .......... 707/769; 707/733; 707/734; 707/634; 705/37; 705/38; 705/14.36; 705/14.49; 705/51

(58) Field of Classification Search
USPC .................. 707/769, 733, 734, 634; 705/10, 705/11, 14.36, 14.49, 37, 51; 709/204, 219
See application file for complete search history.

(56) References Cited

U.S. PATENT DOCUMENTS

| | | | | |
|---|---|---|---|---|
| 5,128,752 A | * | 7/1992 | Von Kohorn | 705/7.29 |
| 5,223,924 A | * | 6/1993 | Strubbe | 725/46 |
| 5,262,875 A | * | 11/1993 | Mincer et al. | 386/354 |
| 5,287,181 A | * | 2/1994 | Holman | 348/473 |
| 5,324,338 A | * | 6/1994 | Holmstrom | 65/377 |
| 5,355,161 A | * | 10/1994 | Bird et al. | 725/22 |
| 5,371,551 A | * | 12/1994 | Logan et al. | 348/571 |
| 5,410,344 A | * | 4/1995 | Graves et al. | 725/46 |
| 5,416,508 A | * | 5/1995 | Sakuma et al. | 725/54 |
| 8,352,984 B2 | * | 1/2013 | Gogoi et al. | 725/46 |
| 2002/0199193 A1 | * | 12/2002 | Gogoi et al. | 725/46 |
| 2003/0105719 A1 | * | 6/2003 | Berger et al. | 705/51 |
| 2003/0154123 A1 | * | 8/2003 | Subbloie et al. | 705/11 |
| 2007/0016514 A1 | * | 1/2007 | Al-Abdulqader et al. | 705/37 |
| 2007/0143398 A1 | * | 6/2007 | Graham | 709/204 |
| 2007/0156856 A1 | * | 7/2007 | Shafron | 709/219 |
| 2010/0179857 A1 | * | 7/2010 | Kalaboukis et al. | 705/10 |
| 2010/0191598 A1 | * | 7/2010 | Toennis et al. | 705/14.36 |
| 2010/0191692 A1 | * | 7/2010 | Gassewitz et al. | 706/47 |
| 2011/0208822 A1 | * | 8/2011 | Rathod | 709/206 |
| 2011/0276396 A1 | * | 11/2011 | Rathod | 705/14.49 |
| 2012/0110467 A1 | * | 5/2012 | Blake et al. | 715/745 |

* cited by examiner

*Primary Examiner* — Frantz Coby

(57) ABSTRACT

Computer-implemented systems and methods are provided whereby Users can dynamically configure and control the use of their preferences for both types and modality of interactions with multiple Provisioners. These inventive systems and methods also enable Provisioners to gain access to User preferences to establish or affect interactions and transactions with Users. Advantageously, these inventive systems and methods provide User control of the receipt of content, matter/substance, experiences and interactions, to enable consolidating management of the User's "interaction profile" into a unified system, while increasing the quality and depth of the relationship between the User and the Provisioner, including but not limited to the creation of emotional/affinity ties to the Provisioner. Furthermore, multiple instances of User profile data can be shared amongst multiple Provisioners in a way that creates affinity between Users and Provisioners and improves User experience, while maintaining User anonymity.

12 Claims, 22 Drawing Sheets

FIGURE: 1 - Prior Art in User Account Management
*Provisioners mandate profile data and use through terms of service*
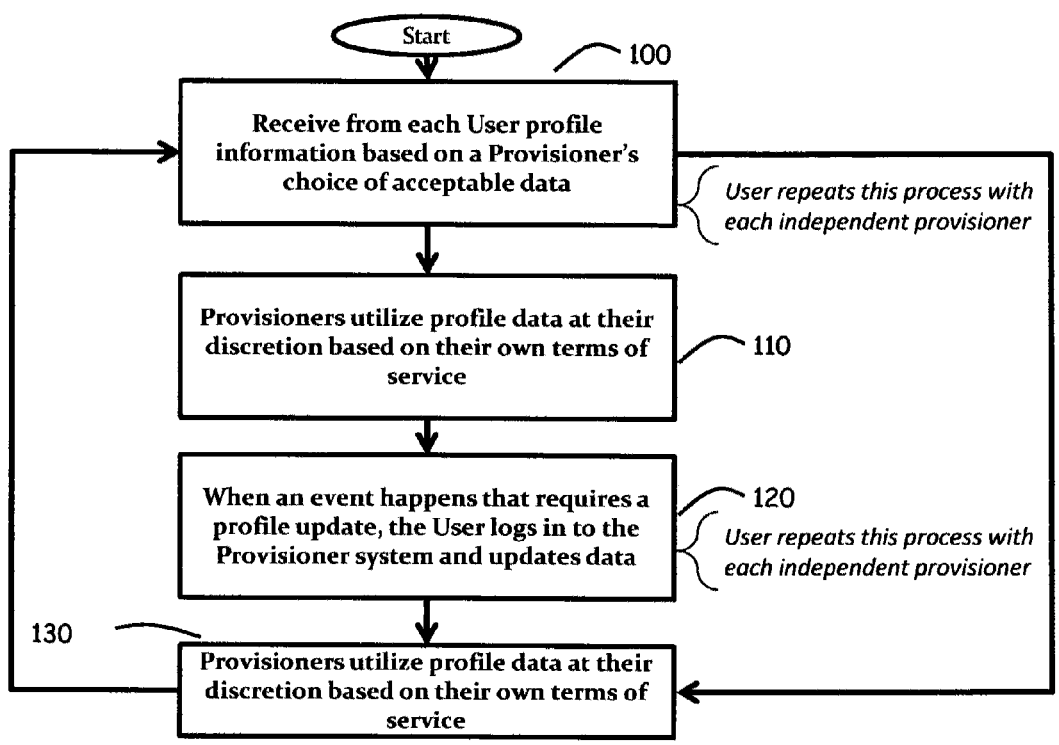

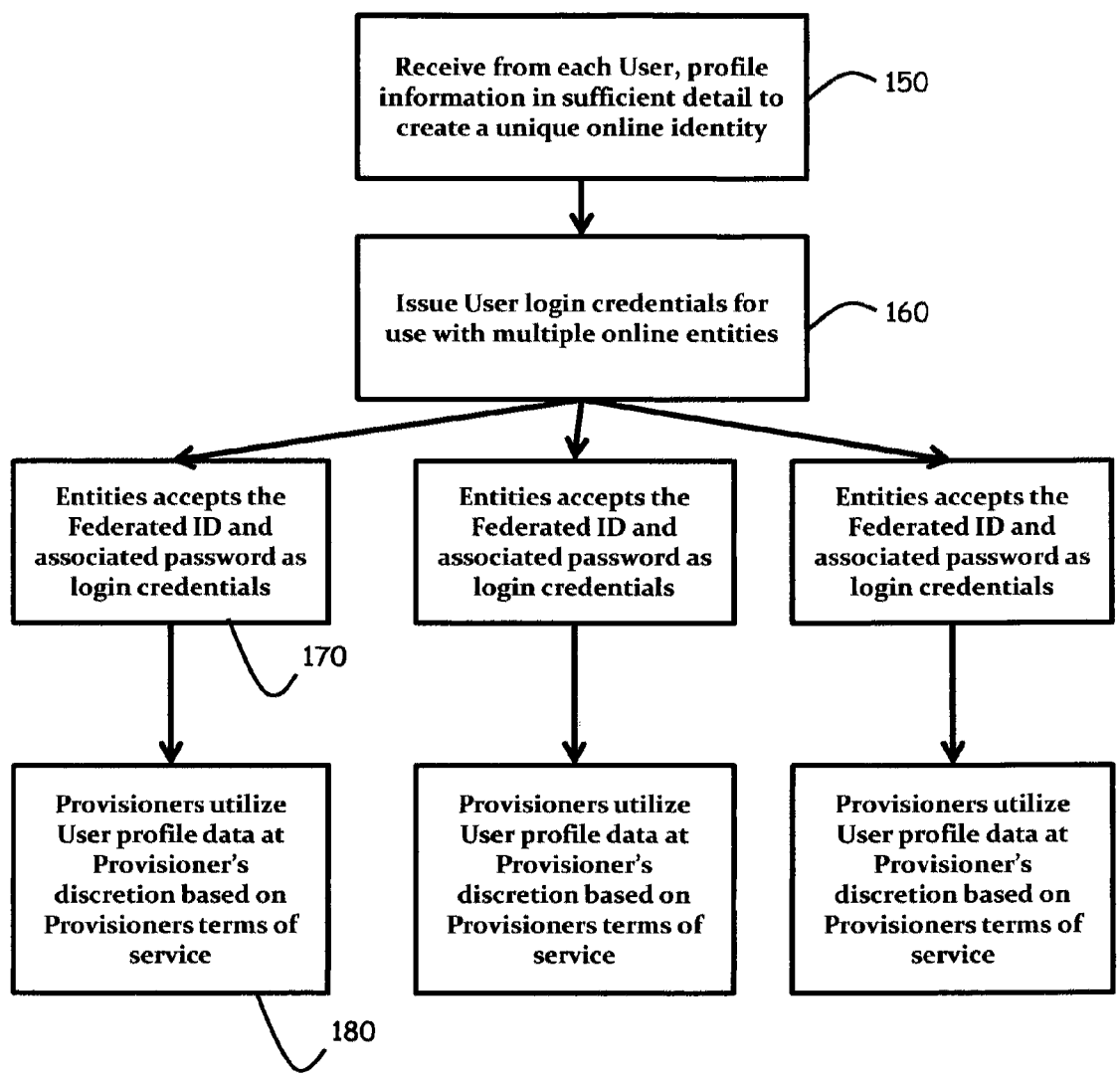
FIGURE: 2 - Prior Art in Federated User Login, e.g. Open ID

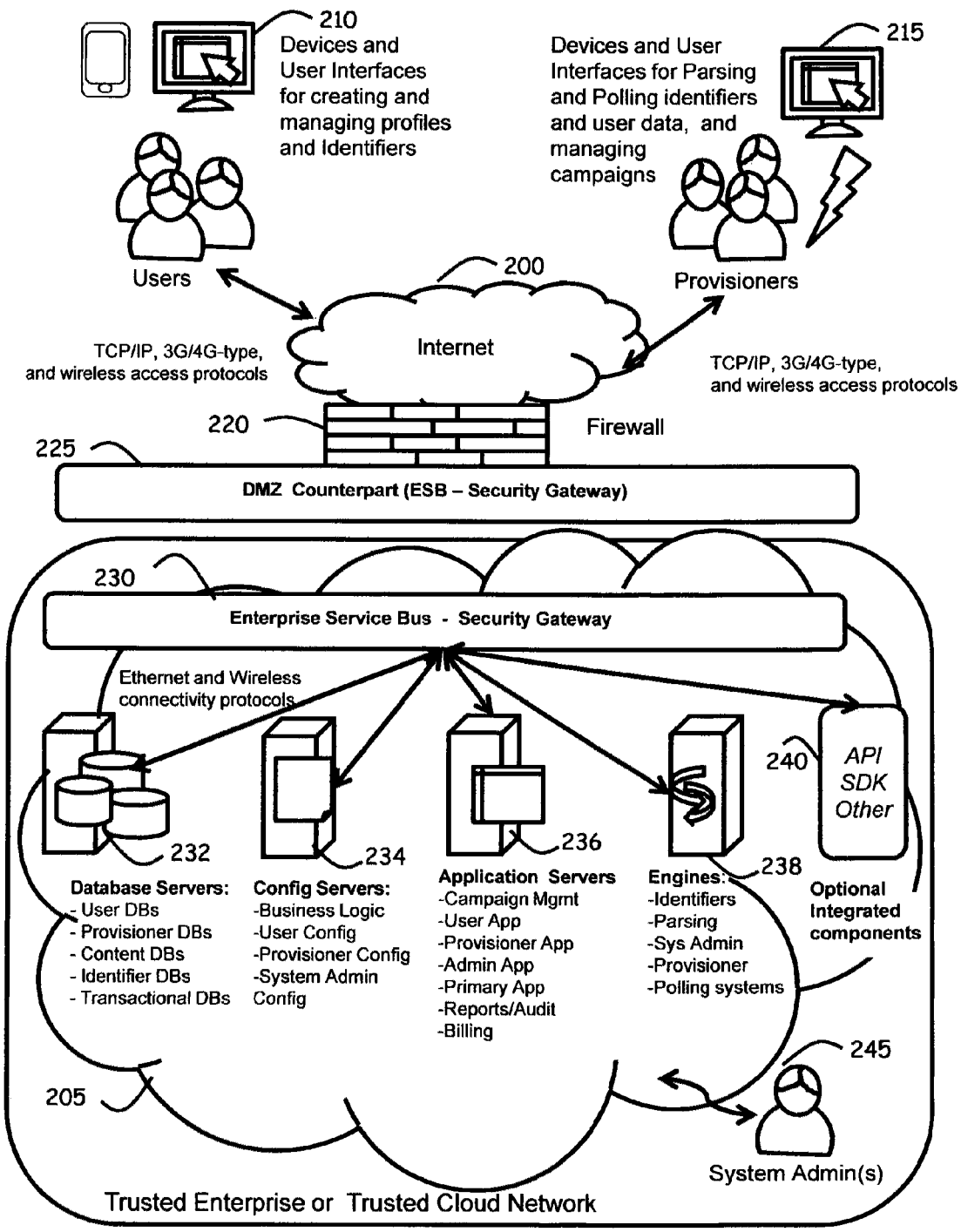

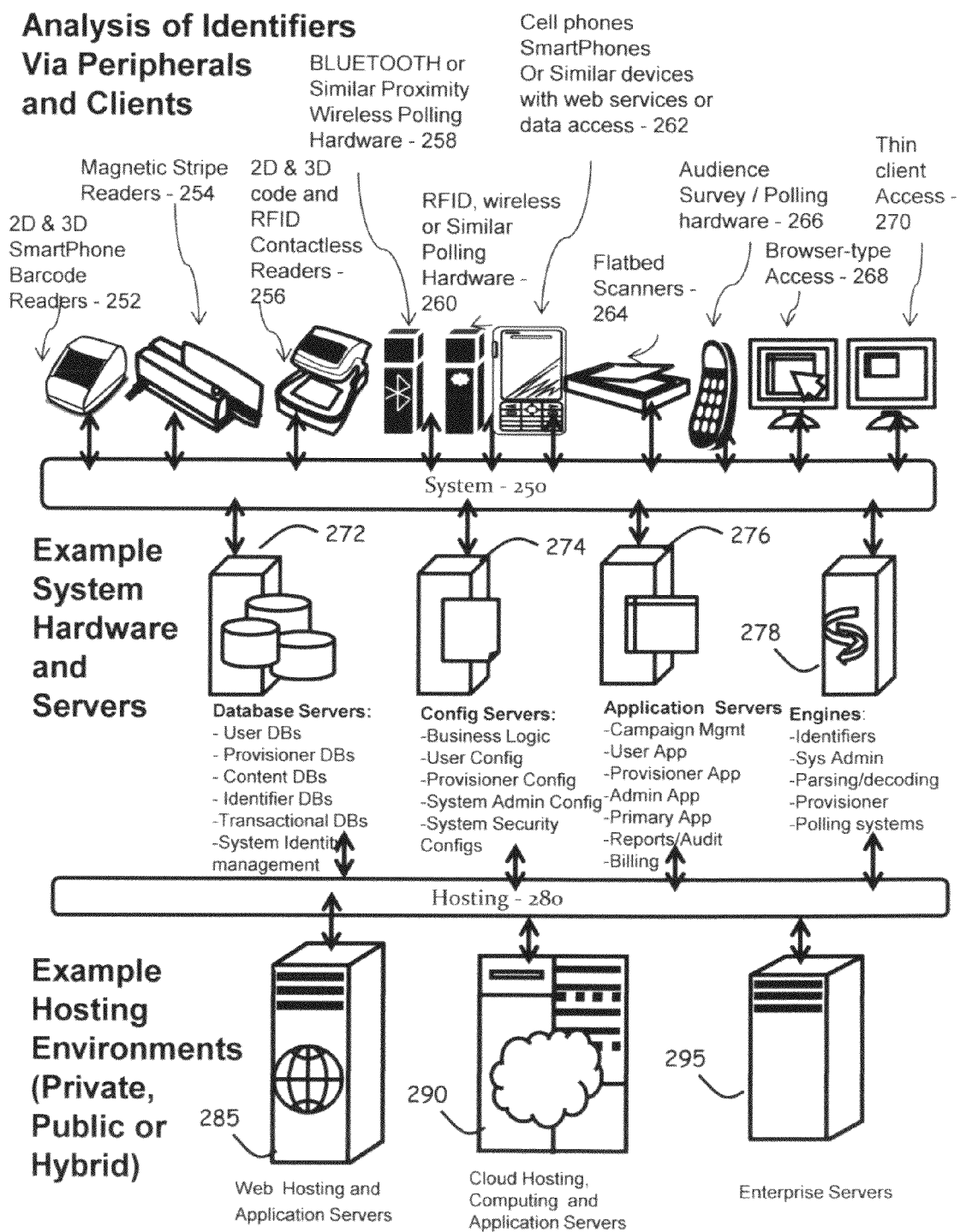

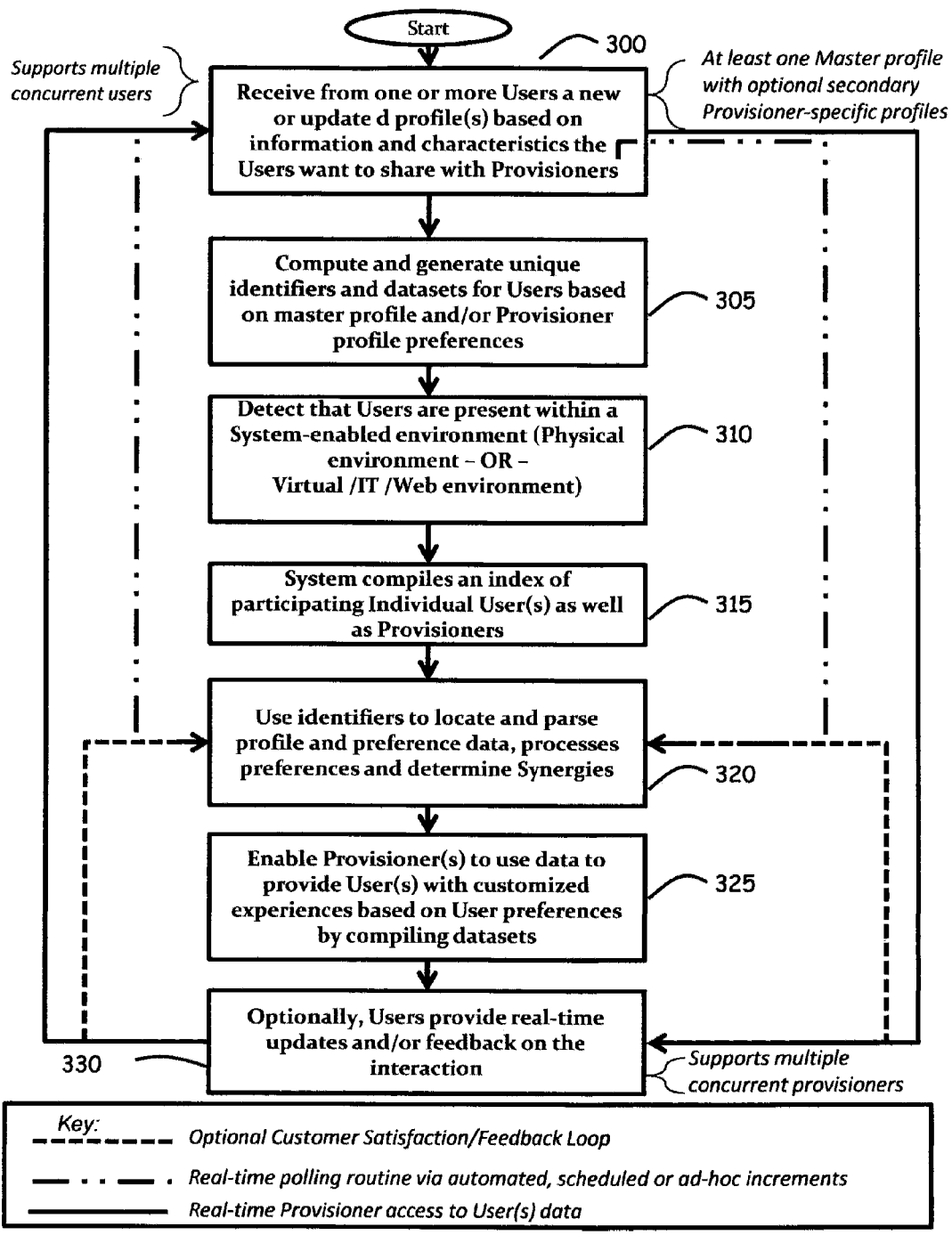

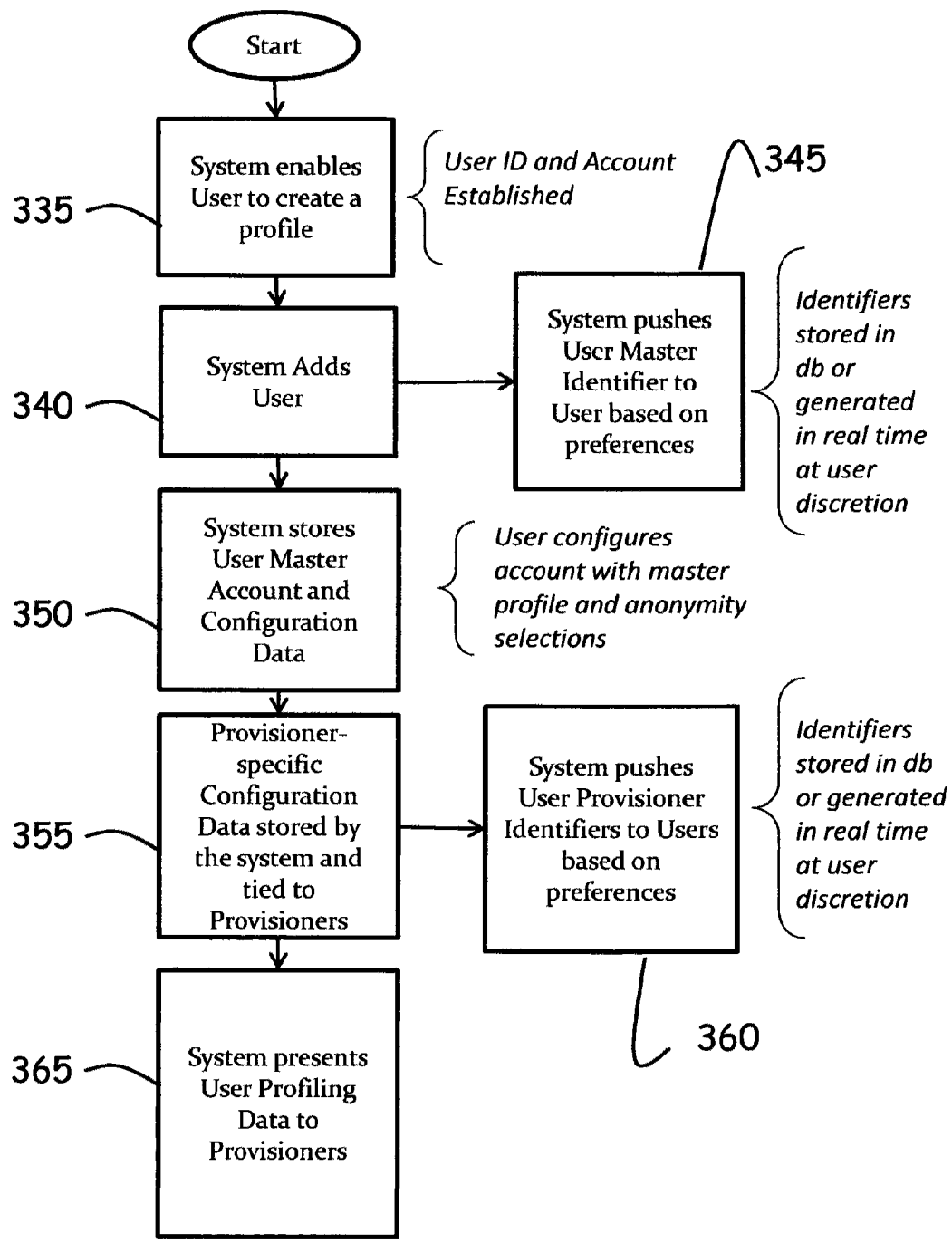

FIGURE: 7- Modalities and Anonymity Variables

USER A

Your Account ID: N847293G47L

Master Modalities Allowed:    370

● ● ● ○ ● ● ● ● ● ○ ○
Experiences  Offers  Samples  Calls  Mail  SMSs  Text  Email  Twitter Posts  FaceBook Posts  Google+ Posts

My master email: [ UserA@mydomain.net ▼ ]
Edit Email List

Select anonymity:
[ Anonymous to ALL ▼ ]

My master phone : [ 555-555-1234 ▼ ]
Edit Phones List
◉ Enable Phone to Push Anonymous to ALL
Annonymous to Select Provisioners
Anonymous to Select Provisioners and Categories
Open to ALL Provisioners    380

My master address: [ 123 Main St. Anytown NY ▼ ]
Edit Address List

---

USER B

Your Account ID: DJ247B292586

Master Modalities Allowed:    375

● ● ● ○ ● ○ ○ ● ○ ● ●
Experiences  Offers  Samples  Calls  Mail  SMSs  Text  Email  Twitter Posts  FaceBook Posts  Google+ Posts

My master email: [ UserB@myemail.com ▼ ]
Edit Email List

Select anonymity:
[ Open to ALL Provisioners ▼ ]

My master phone : [ 888-888-4321 ▼ ]
Edit Phones List
◉ Enable Phone to Push Anonymous to ALL
Anonymous to Select Provisioners
Anonymous to Select Provisioners and Categories
Open to ALL Provisioners    385

My master address: [ 456 First St. Mytown NJ ▼ ]
Edit Address List

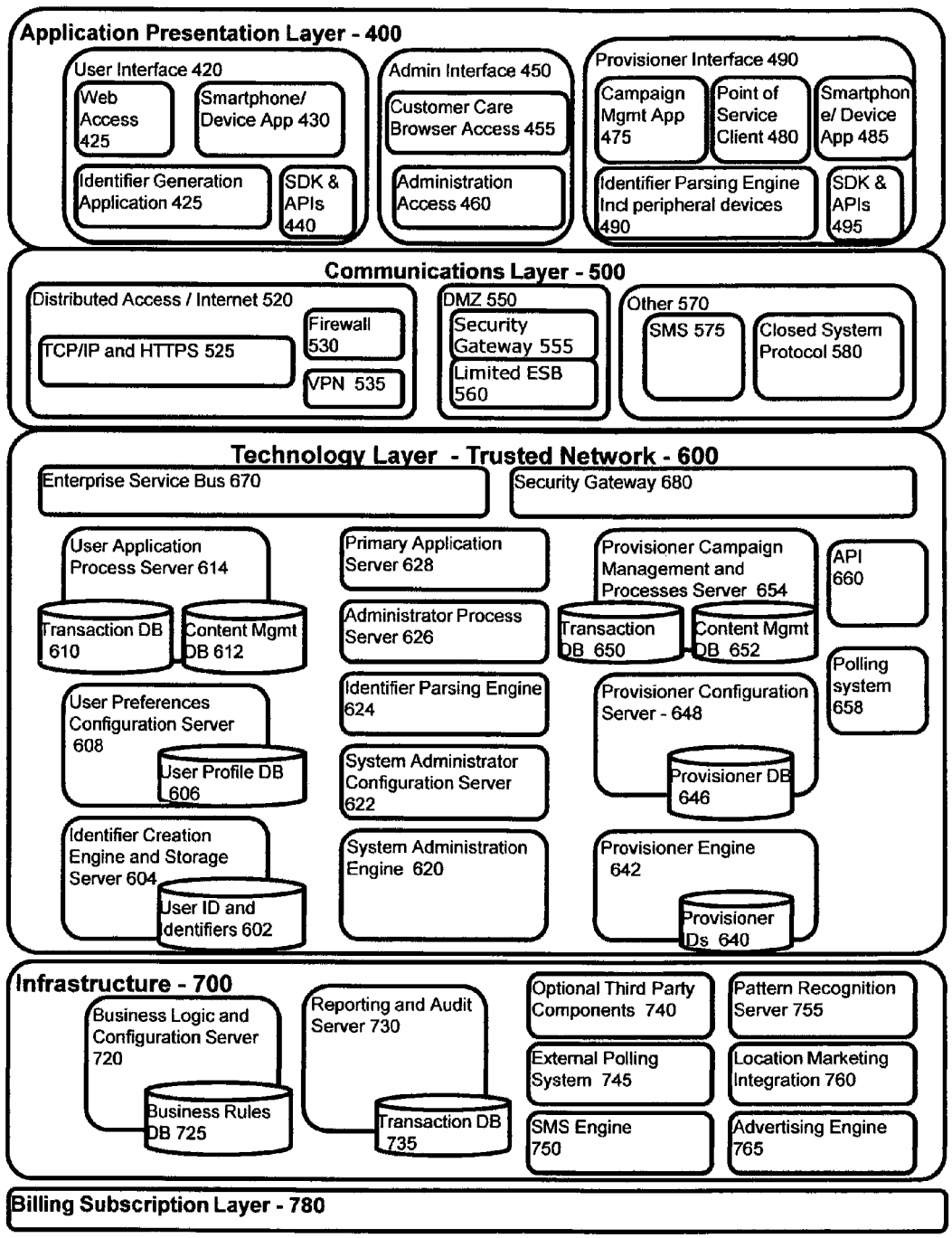
FIGURE: 8 – Exemplary Architecture

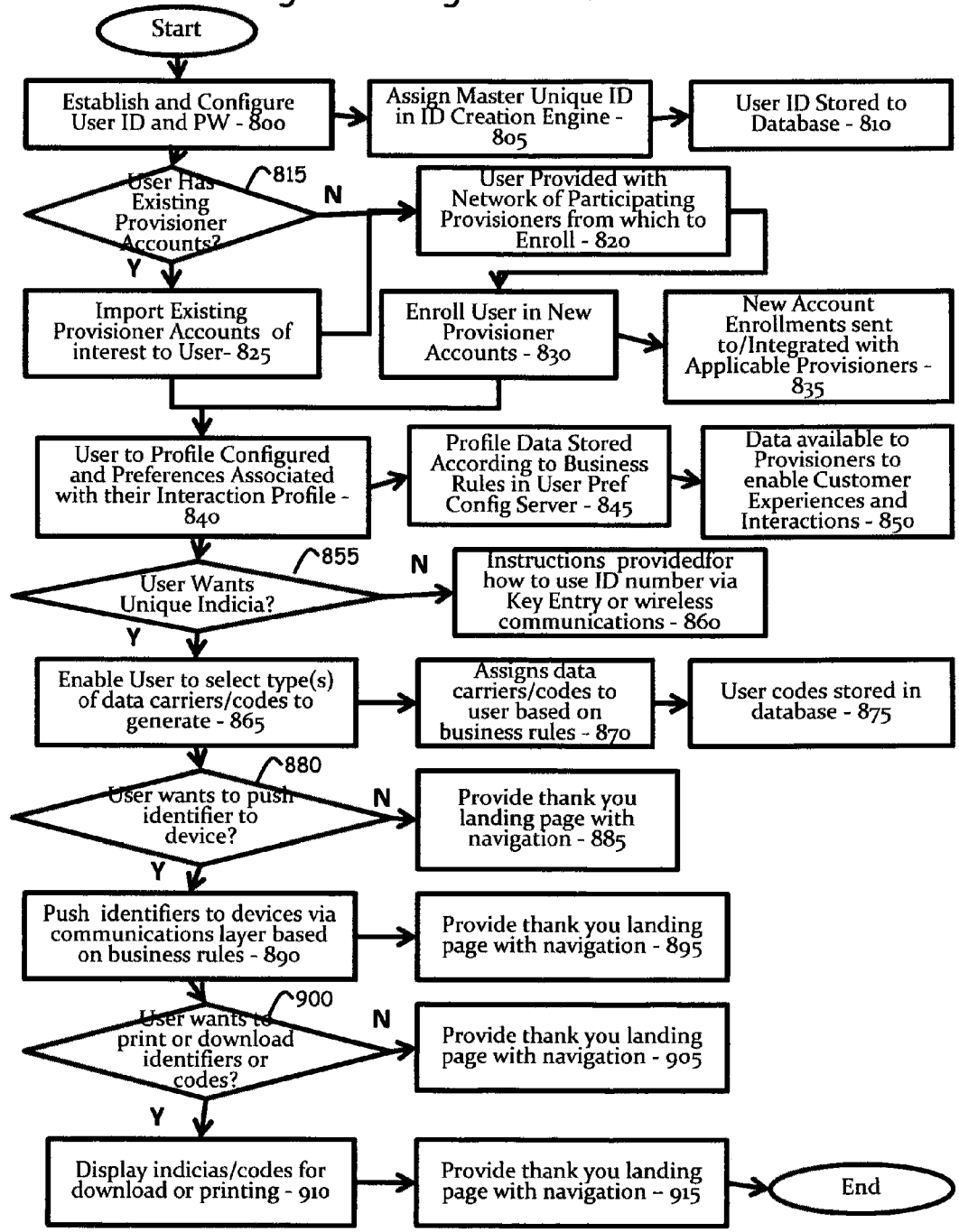

FIGURE: 10 – Example Master Profile Configuration Page

Your Account ID: 123DRF4566

First: [        ]  Middle: [    ]  Last: [        ]

City, State, Postal Code: [City]  [- State - ▼]  Postal Code

International Addresses

Birth Date: [mm/dd/yyyy] [📅]   ● Keep birthdate confidential
○ Only show month/day Edit Pic    Delete Select Master Anonymity
UPGRADE Master Modalities Allowed:

| E | S | M | P |
|---|---|---|---|
| Email | SMS | Mail | Phone |

[?] What is this?

⚠ You will be able to disable any modalities on a Provisioner-specific basis

CANCEL (Cancel Profile)

My master email: [myname@mydomain.net ▼]
Edit Email List

How To Download Apps to Phone

My master phone number: [555-555-1234 ▼]
Edit Phones List

○ Enable Phone to Push  [?] What is this?

PUSH CODES TO MY DEVICES

My master address: [123 Main St  Anytown NY ▼]
Edit Address List

Disabled Until Profile is Complete

Areas of Interest
- Automobiles
- Baby Products
- Computers and Devices
- Education
- Electronics
- Fashion and Accessories
- Furniture
- Gifts
- Hardware
- Health
- House and Home
- Machinery
- Sports

\> \<

Allowed
- Automobiles
- Computers and Devices
- Hardware
- Health
- Sports

CNTL+CLICK to select multiples

UPDATE (Save Changes)

PAGES [1] [2] [3] [4]

FIGURE: 11 - Example Provisioner Profile Configuration Page

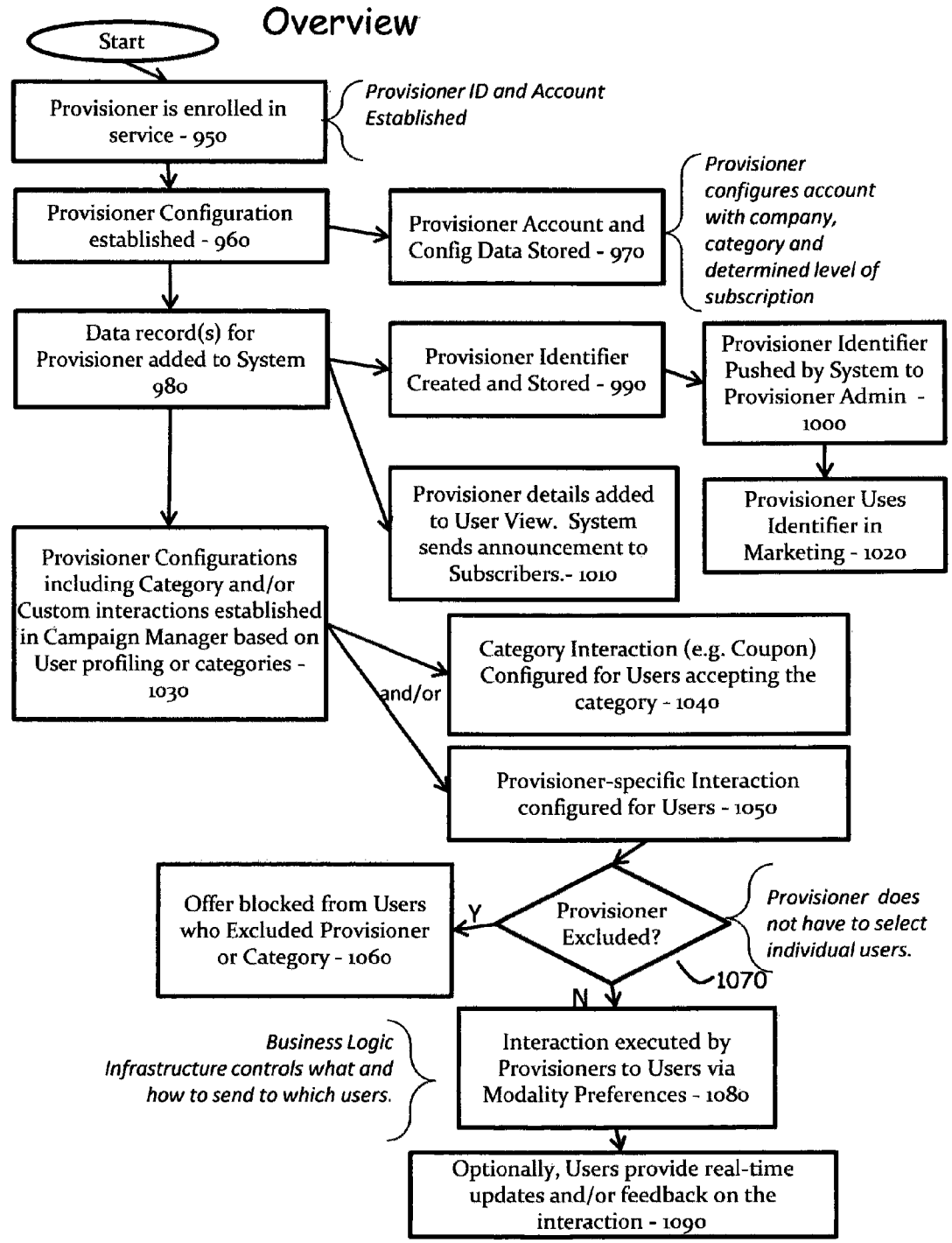
FIGURE: 12- Provisioner Workflow Overview

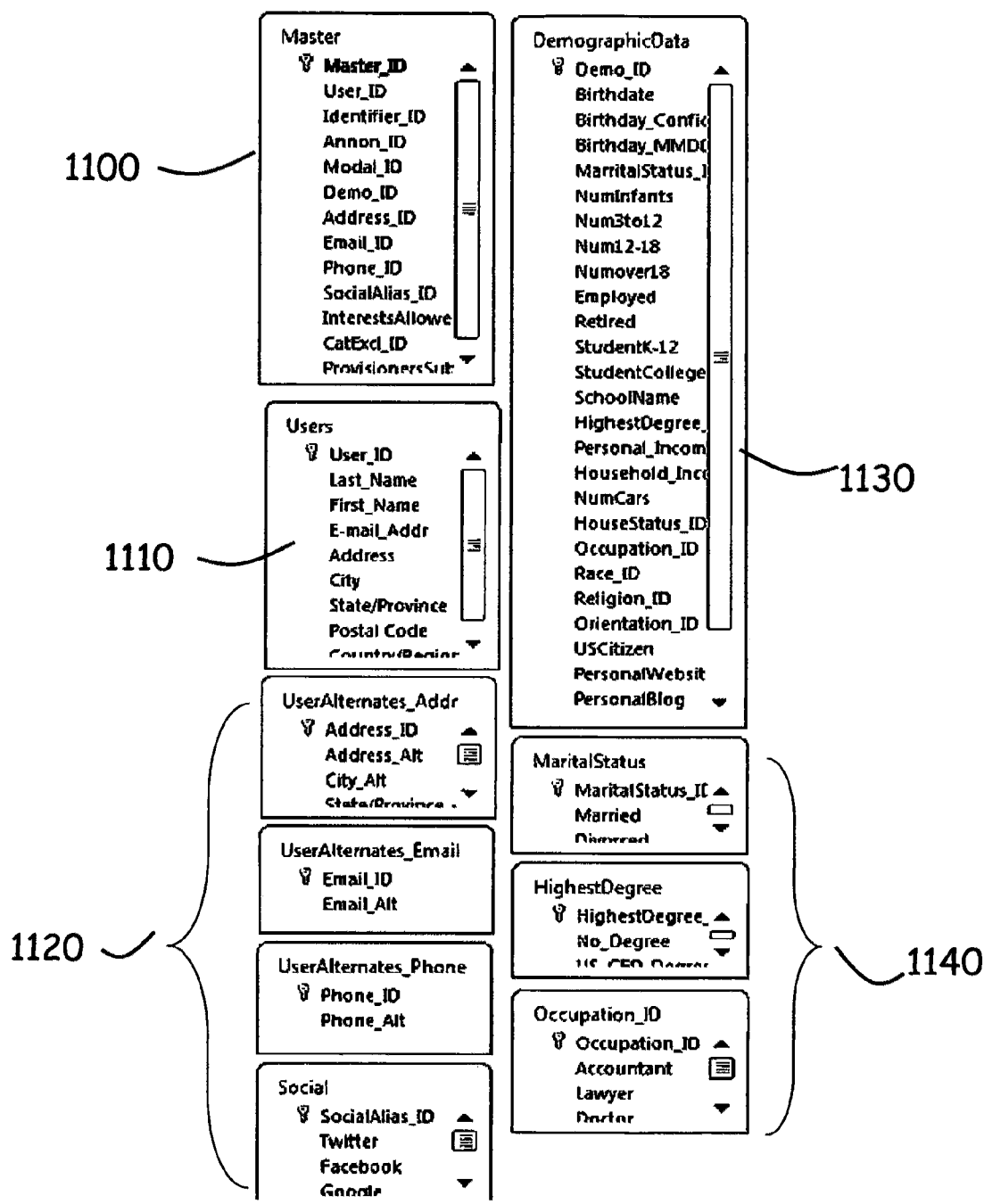
FIGURE: 13 - Example Partial Relational Database Tables for User Master Demographic Data FIGURE: 14 – Example Partial Relational Database Tables for Content Preferences and Desired Modalities
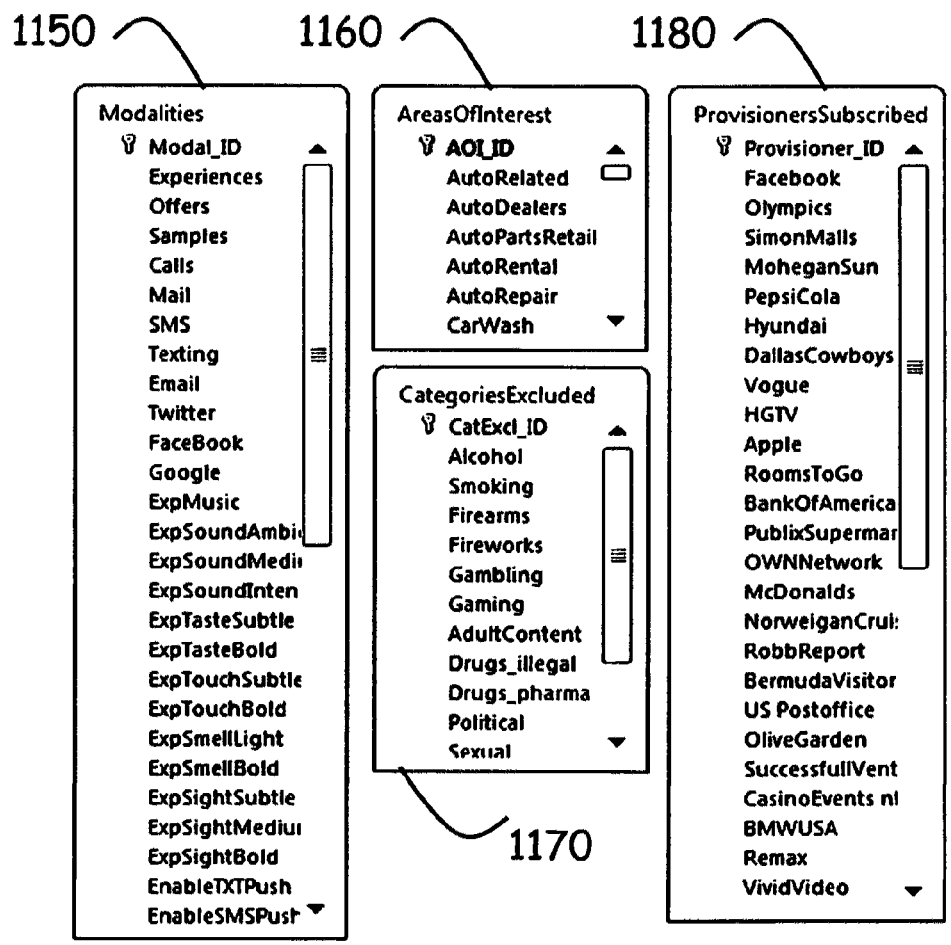

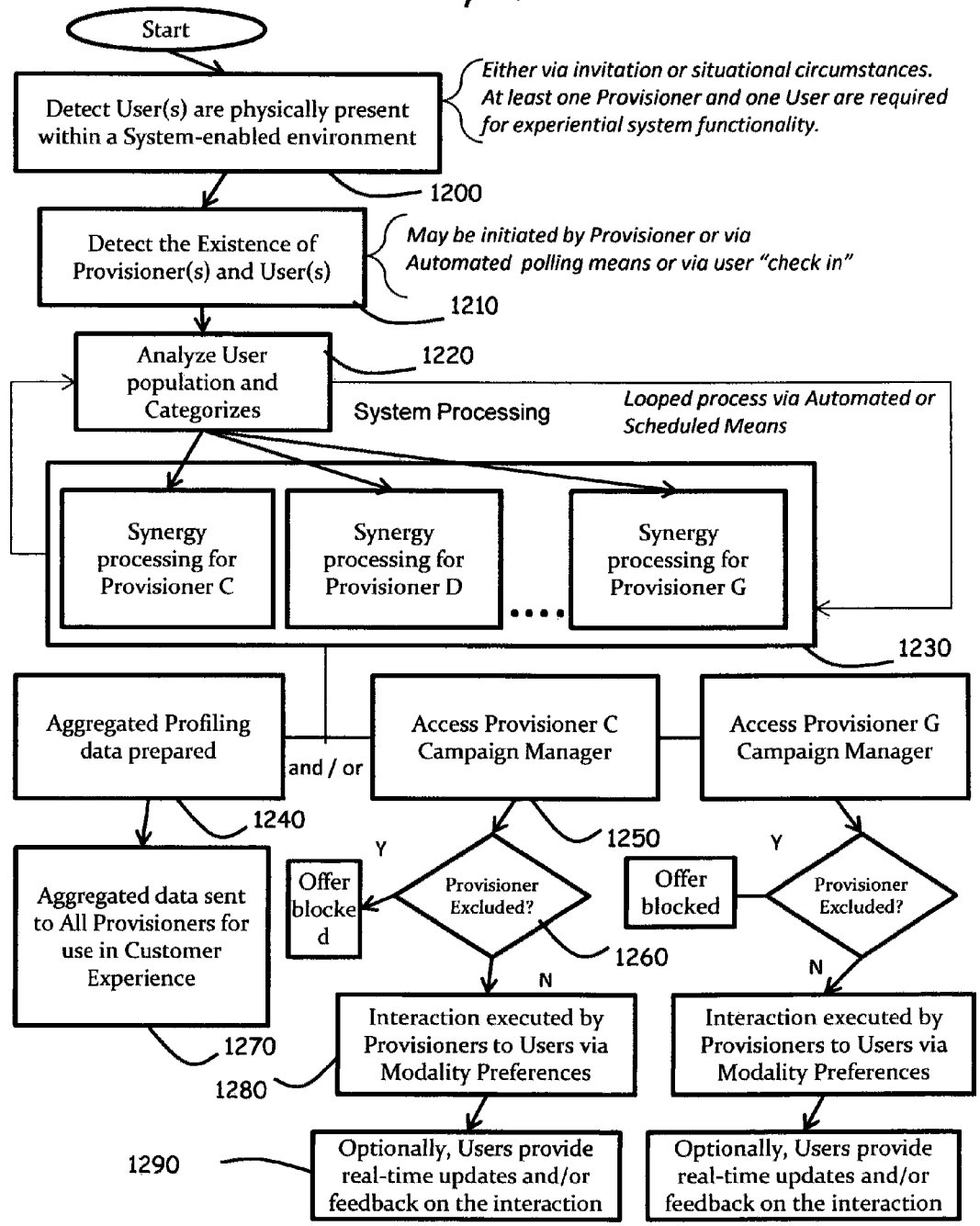

FIGURE: 16 - Example Portable Device User Interface

FIGURE: 18 - Provisioner Dashboard
In Real Time via Mobile Device

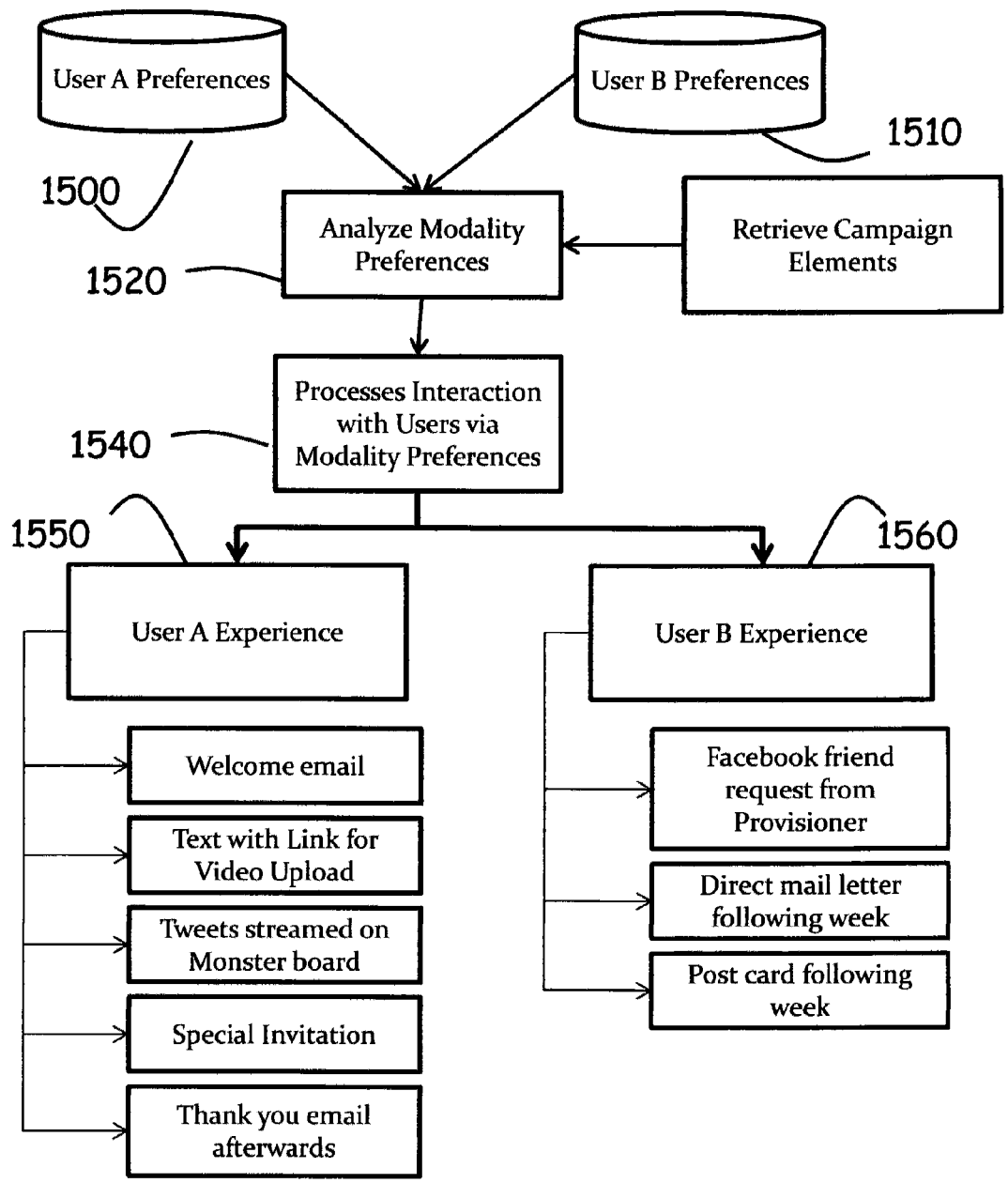
FIGURE: 19 - Two User Customer Experience with Single Provisioner at a Single Event

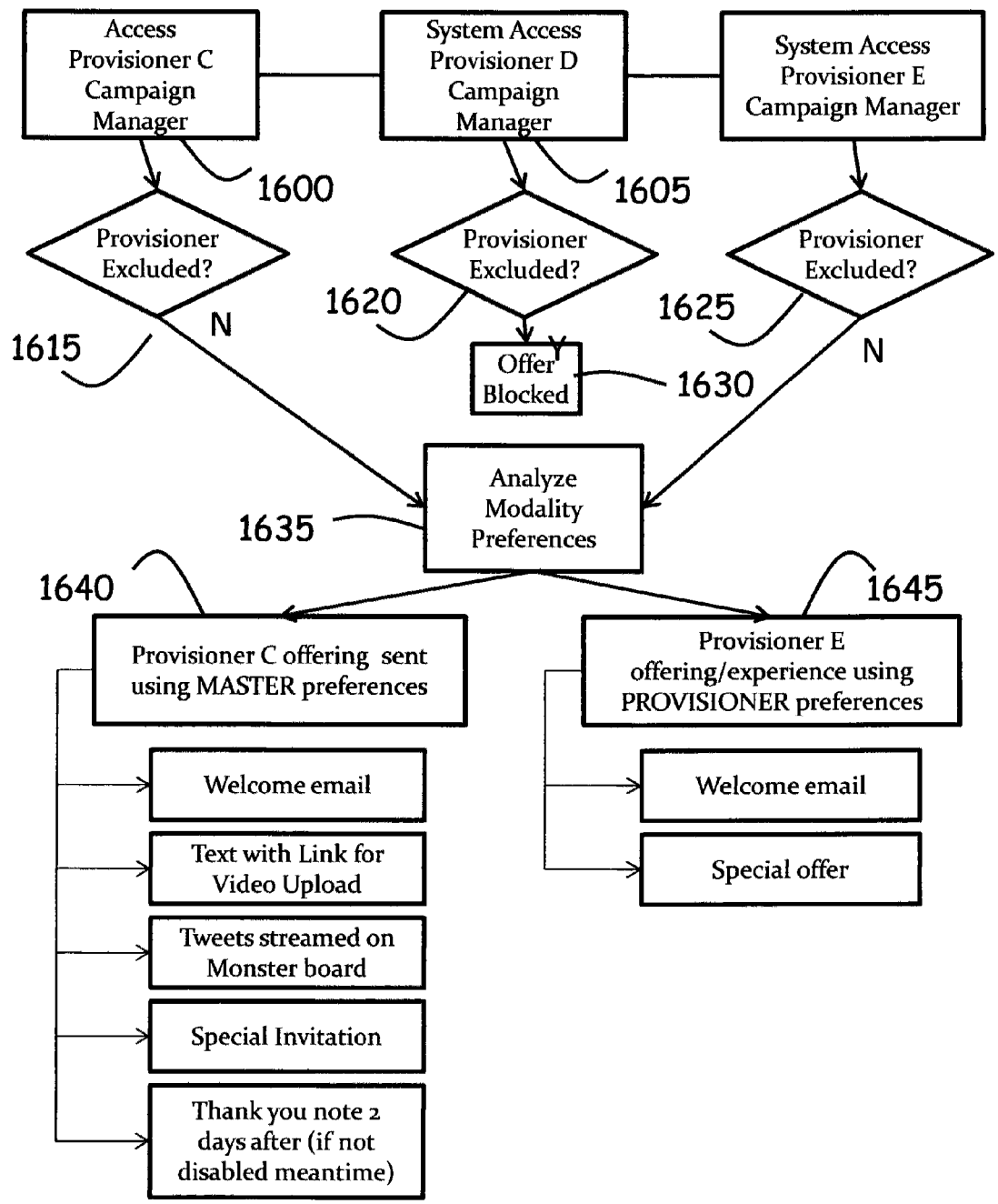
FIGURE: 20 - Single User Customer Experience with Multiple Provisioners based on Provisioner Preferences

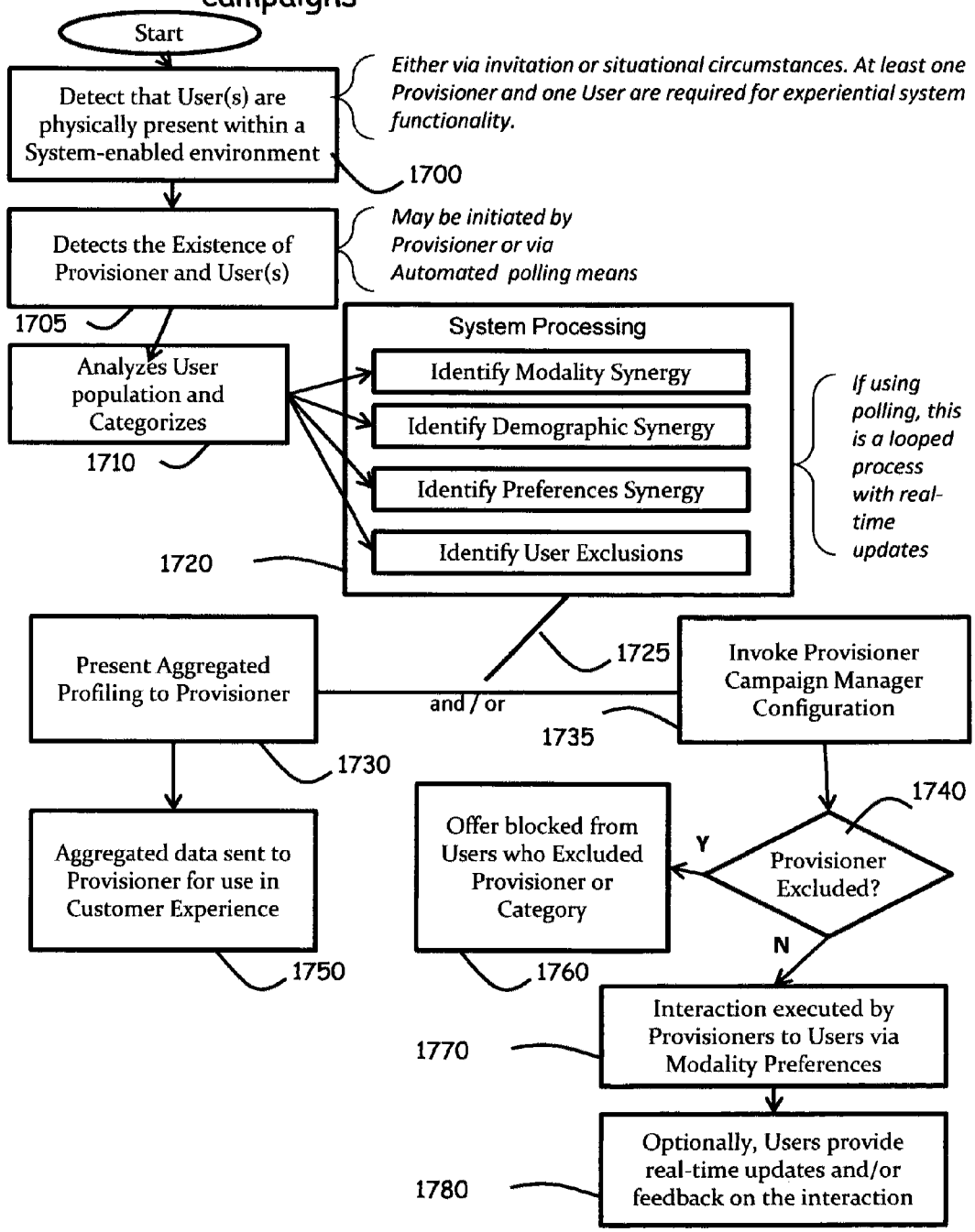

FIGURE: 22 - Figures to Accompany Glossary
 1800
 1805
 1806
6DHU479NFKUED03K:D0HL  1807

SYSTEMS AND METHODS TO CONSOLIDATE AND COMMUNICATE USER PROFILES AND MODALITY PREFERENCES INFORMATION FOR CONTENT DELIVERY OR INTERACTION EXPERIENCES

CROSS-REFERENCE TO RELATED APPLICATIONS

This application claims the priority of U.S. Provisional Application Ser. No. 61/456,004 entitled "Systems and Methods to Consolidate and Communicate Profiles and Modality Preferences for Content Delivery or Interaction Experiences" dated Oct. 29, 2010, the contents of which are incorporated herein by reference in their entirety.

U.S. GOVERNMENT AGENCY/FEDERALLY SPONSORED RESEARCH AND DEVELOPMENT

Not applicable. This system was not made by or for an agency of the United States Government or nor under a contract with any agency of the United States Government.

FIELD OF THE INVENTION

In one aspect, the system relates to the business-oriented practice of communications and marketing, and more particularly in the field of User and customer relationship management and "customer experience", which is a marketing term that refers to the emotional and physical reaction a consumer experiences while interacting with another party or other entity.

In a further aspect, the system relates to the consumer-oriented practice of managing a User's individual User (e.g., consumer) profile. As such, at least some implementation variations of the system focus on the ability of the User to control and manage the User's choices regarding the communications and modalities of content, content, matter/substance, experiences and interactions and interactions received from a Provisioner, that result in a "customer experience", and to do so through an organized system that is hosted in a computing environment and managed in real-time.

At least some implementation variations of the system focus on the ability of the User to use their centrally-controlled profile(s) across multiple or concurrent Provisioners as a means to both simplify and control the profile creation and management process while gaining control over what data and in what circumstances the User wants to share information with Provisioners.

In a further aspect, the system creates a unique identifier and associated profile for the User to use in the "real" world, outside of any web or virtual environment.

BACKGROUND

Currently, the manner in which a User establishes desire for content or interaction with other parties involves establishing some sort of physical profile (e.g. reader response card, personal relationship, customer profile form) or digital profile (e.g. web-based, browser-based or other digital inputs) with one or more entities (businesses, organizations, content providers, schools, etc.) Currently, in each profile account or membership, a User "opts in" for communications with this entity and provide contact information and content and modality preferences. In some instances, merely making an inquiry to or purchase from an entity creates an implied assumption or explicit permission on the part of the entity that a given User consents to receipt of continued communications, solicitations, electronic mail ("email") messages, etc., from that entity; in such situations, the only control a User has over use of his or her profile is by completing a so-called "opt out" form, to decline receiving certain types of communications and/or solicitations from the entity. Such "opt out" forms are not usually globally applicable across many entities, and are difficult to update and modify once completed. For example, a User may want to "opt out" of all communications from an online store during certain parts of the year, but may very much want at least certain types of communications during the holiday buying season, or when certain items become available or go on sale, etc. The presently available mechanisms for a User's control of these communication preferences can be inadequate to keep up with a User's changing needs, and often require the User to manually contact each entity to update preferences any time the User's needs change.

In addition, an individual may have a few, dozens, or hundreds of consumer identities, depending on his or her consumer behavior. These current consumer identities may be based on a number of different characteristics. For example, some identities are based on authentic personal identity, such as used in highly secure transactions such as those conducted with financial institutions and hospitals. Some types of websites, such as certain social networking websites require use of a User's real name, such as GOOGLE+. Some applications and websites, such as FACEBOOK, MYSPACE and TWITTER, permit use of a pseudo personal identity (Jim Richards versus James Patrick Richards) or sometimes a hidden personal identity such as "bigredteddybear54321" or "ilovetoskiatnight". Further, these identities may be used with physical or online entities.

Examples of contact information typically collected during the enrollment or account update process include but aren't limited to name, address, phone, email and other demographic information such as language preferences, sex, income, education, religion, language preferences, sexual preferences, physical attributes, and other characteristics that describe them. Examples of interests (also referred to as interests, hobbies, activities, etc.) include but aren't limited to specific interest areas such as automobiles, apparel, music, news, real estate, business services, jewelry, travel, healthcare, etc. Current examples of modalities include calls, emails, texts/SMS and other solicitation-oriented, invitation-oriented or offer-oriented transactions.

FIG. 1. shows a high level process chart for a typical User profile transaction between a User and a Provisioner. In this scenario, a User visits a Provisioner website and enters data according to pre-determined data fields controlled by the Provisioner 100. Provisioners will typically host a webpage that relates to their terms of service, and in that webpage will describe if and how they will use the User data 110. For a User to obtain the benefits of the relationship with the Provisioner, the User is required to accept the terms of service. Events or preferences may change that require a User to update their profile. When the User updates the profile data, the data is refreshed in the Provisioner database and available to the Provisioner once again to use as they deem 130, typically within the scope of any published policy.

FIG. 2. shows a high level, multi-Provisioner flowchart wherein the User uses one "Federated ID" as login credentials for each of many Provisioner's independent websites. In this scenario, a User establishes an online Profile with one of many federated ID providers, such as Open ID, in sufficient detail to create a unique online identity 150. Once processed by the system, the User may use their federated identity as credentials to log in to any Provisioner who accepts the credentials 170. In this scenario, the User dataset is available to participating Provisioners, and the Provisioners may use the User profile data at the Provisioners discretion based on terms of service.

Additionally, most, but not all, User profiles are Internet-specific and do not currently assist the User entity in their experiences in the analog (i.e. "real") world. Internet-specific profiles engage various types of content, including but not limited to subscriptions to digital content such as newsletters, media files, ebooks, data files, mobile web files, etc. Customer affinity cards, also known as "customer key tags" contain barcodes used to tie retail transactions to a store's database, and by enabling customers to identify themselves as "frequent shoppers" the store may allow customers to benefit from discounts as well as to identify offers that may be of interest to customers.

Nowhere in current art do Users have the ability to specify how they want to interact with the store, and Provisioners do not have any way to affect the customer experience on a customer-by-customer basis, nor to provide an aggregate customer experience based on preferences, especially those that change over time.

Users who try to manage many, dozens or hundreds of profiles can become overwhelmed by keeping track of current systems that make use of User profile and preference information. Users often have to add, modify, and/or delete the same information over and over again in different portals. If an element of a User's demographic data changes (for example, a User gets married and changes names, moves, changes phone number, changes email address, etc.), the User has to update the information in each portal separately.

Moreover, with presently available techniques for using User profile and preference information, Users can become overwhelmed with marketing messages and barraged with content and experiences via email and location-based marketing in which they are not interested and are not qualified prospects. This wastes the marketing investment of the Provisioner (i.e., the entity making use of the profile to initiate some type of contact or interaction with the User) while adding to the frustration of the User or consumer. The current state of art in Provisioner systems is also flawed, in that Provisioner systems only have access to answers to specific questions they ask of the Users, many times missing key profile information that would allow the Provisioner to expand their relationship, increase affinity and/or increase revenue from Users.

Moreover, there is currently no way for Users to express interest or feedback related to their customer experience in real-time, nor a way for Provisioners to analyze the information in real-time.

SUMMARY OF THE INVENTION

The invention is a system for managing virtual and physical world interactions and transactions between two entities as a platform system, where at least one Provisioner configures at least one of an interaction and/or a transaction, where the interaction or transaction is facilitated by a User-configured interaction profile to include at least one combination of preferences, the preferences selected from modalities consisting of sound, taste, touch, smell and sight preferences, as well providing as actions capable of happening in at least one of a physical environment and a virtual environment.

The system stores User-defined identity and preferences data and processes and analyzes this User data and correlates it to the User identity. The system then analyzes the data to identify synergies in aggregate groupings of User data. User-specific data is controlled by the User in that the User specifies the access to profiling data by Provisioners enrolled in the system. The User is able to change its identity and preferences data in real-time via access to the platform data; and the system notifies one or more Providers of changes to identity and preference data of the User. User identity and associated profile data and preferences are tied to at least one of a plurality of identity records via a database structure, wherein the system is further configured to index the record(s) associated with the User data according to a unique identifier. The resulting unique identifier is provided in at least one of plain text, visual matter, machine-readable code or other data-carrying structure or token, and is configured as a unique identifier which can either contain or point to User data based on User inputs.

Provisioner use this data singularly or in aggregate to deliver to the User at least one of an interaction or a transaction, wherein the delivery of the at least one of the interaction and transaction is accomplished in at least partial synergy with at least one specified User preference.

Aggregated data is analyzed to determine at least one synergy or at least one substantially common preference amongst a plurality of Users, and then enables the Provisioner to use the aggregated data to customize at least one of an interaction and a transaction between the Provisioner and User. These interactions include of at least one of or a plurality of data, an image, an invitation, a solicitation, an offer for sale, an advertisement, a reward, a prize, a membership, a discount, a coupon, an experience, a sound file, an aural experience, a taste experience, an aromatic experience, a visual experience, a touch experience, a tangible item, a tangible substance, interaction, a physical experience, a virtual experience or interaction; and The system enables the Provisioner to access, at least periodically, updates to User preference profiles in singular or aggregate fashion, providing the Provisioner has not been blocked by a User's exclusion configurations, and the analyzed data enables the provisioner to configure a User campaign, e.g. via a an organized campaign management utility or function.

The system enables Users to configure at least one or a plurality of User's corresponding identities and profiles in one or more anonymity configurations, including but not limited to the following: User identity information only; a combination of User identity with one or more elements of profile data; a combination of profile data with an alias User identity; and/or a combination of profile data with an anonymous User identity; complete shielding of the system and the Provisioner from any User or identity or profile data. At all times the anonymity status of each of the User's identities is within the control of the User, including the ability to configure different identities and profiles in different configurations. Additionally, the User is enabled to update anonymity settings in real-time. Also, the Provisioner is enabled to allow Provisioners to pull all of some data from the system unless expressly precluded on a User-specific and profile-specific basis, as controlled by the User.

The system is configured to enable the User is to use the system credentials to participate in Provisioner interactions via a Federated Identity system, including using the User credentials to gain access to Provisioner systems.

Additionally, the system enables Users to provide real-time updates to data including customer feedback data for use by Provisioners in gauging the interactions with Users in regard to the customer experience.

Any and all updates to User identities, profiles, preference data and real-time feedback is available to Provisioners unless expressly precluded by the Users, including data where the User identity is anonymous and varying levels of profile and preference data are allowed.

BRIEF DESCRIPTION OF THE FIGURES

The advantages and aspects of the present invention will be more fully understood in conjunction with the following detailed description and accompanying drawings, wherein:

FIG. 1 is Prior Art in User Account Management, showing prior art

FIG. 2 is Prior Art in Federated User Login, e.g. Open ID, showing prior art

FIG. 3 is Overall System Overview, in accordance with an embodiment of the invention;

FIG. 4 is Examples of System Hardware, in accordance with an embodiment of the invention;

FIG. 5 is Functional Overview in accordance with one embodiment of the invention; and FIG. 6 is Simplified User Enrollment, in accordance with an embodiment of the invention.

FIG. 7 is Modalities and Anonymity Variables, in accordance with an embodiment of the invention.

FIG. 8 is Exemplary Architecture, in accordance with an embodiment of the invention.

FIG. 9 is Detailed Enrollment Logic for generating Identifiers, in accordance with an embodiment of the invention.

FIG. 10 is Example Master Profile Configuration Page, in accordance with an embodiment of the invention.

FIG. 11 is Example Provisioner Profile Configuration Page, in accordance with an embodiment of the invention.

FIG. 12 is Provisioner Workflow Overview, in accordance with an embodiment of the invention.

FIG. 13 is Example Partial Relational Database Tables for User Master Demographic Data, in accordance with an embodiment of the invention.

FIG. 14 is Example Partial Relational Database Tables for Content Preferences and Desired Modalities, in accordance with an embodiment of the invention.

FIG. 15 is Multi-Provisioner Interaction With a Plurality of Users, in accordance with an embodiment of the invention.

FIG. 19 is Two User Customer Experience with Single Provisioner at a Single Event, in accordance with an embodiment of the invention.

FIG. 20 is Single User Customer Experience with Multiple Provisioners based on Provisioner Preferences, in accordance with an embodiment of the invention.

FIG. 21 is Single Provisioner, Multi-User, with aggregate and individual user campaigns, in accordance with an embodiment of the invention.

FIG. 22 is Figures to Accompany Glossary, in accordance with an embodiment of the invention.

Figure 16:
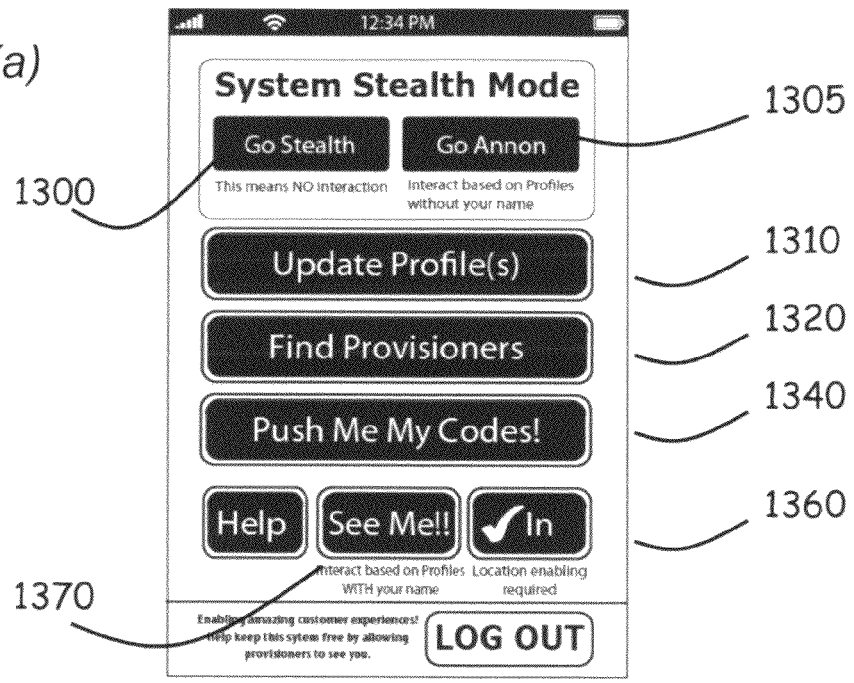
FIG. 16 is Example Portable Device User Interface, in accordance with an embodiment of the invention.
Figure 16:
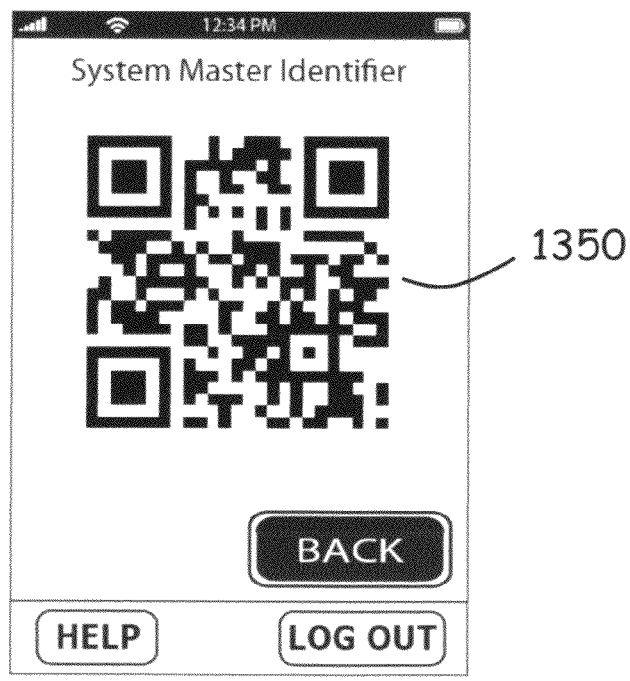

The emphasis of the drawings are generally being placed upon illustrating the principles of the invention.

DETAILED DESCRIPTION

The disclosure of this patent document contains material which is subject to copyright protection. The copyright owners have no objection to the facsimile reproduction, by anyone, of the patent document or the patent disclosure, as it appears in the Patent and Trademark Office patent file or records, but otherwise reserves all copyright rights whatsoever.

Overview of Exemplary System

Managing Interactions and Experiences:

The system comprises an organized system whereby Users configure, primarily via the use of a computing system (including but limited to a personal computer, tablet, mobile communication device such as smart phone or other device), either directly or via a proxy such as a customer service representative, the User's preferences for both content and modality related to their interactions with multiple other parties or Provisioners.

In at least some implementation variations, the system provides a system that can be deployed in multiple implementation variations that result in the User's ability to mandate, limit or encourage content, communications and experiences in accordance with the User's specific preferences across multiple or concurrent Provisioners.

Users Establish, Maintain and Control a One or a Plurality of Profiles Through a Single Portal Based on Users Choices Regarding What Profile and Preference Data to Provide:

Advantageously, at least some implementation variations of this system create the opportunity for the development of systems that put the control of the data associated with each User, as well as the receipt of content, matter/substance, experiences and interactions, into the hands of the User for the purpose of both consolidating the management of the User's "interaction profile" into a unified system, while enabling them to manage the data in real-time, and also increasing the quality and depth of the relationship between the User and the Provisioner, including but not limited to the creation of emotional/affinity ties to the Provisioner.

In at least one implementation variation, a User establishes a multiple "interaction profiles" associated with the User account, with the information the User desires to provide to Provisioners; and the Provisioners, by accessing this preference and data, gain insight into the User's needs and provide content to them in the "modality" or manner desired.

In at least one exemplary implementation variation, the system and method of the system involve defining an identifier element on behalf of the User. The element can, for example comprise any one or more of an image, unique identifier (ID), transmission ID, transaction ID, User profile name, or subscription or other data-carrier that is machine- or human-readable, to communicate, either by a unique reference to a profile database or contained in the code itself, on behalf of its User, the desired content type and content modality or delivery method that results in a "customer experience". In this way, the identifier or code may be implemented to contain key profile and modality preference data embedded in the code for use in unconnected environments, and/or to include a database pointer in the code for use in querying the data repository for more information.

Aggregate or Individual Data Provided to Provisioners for Use in Designing Virtual and Real-World Interactions and Experiences with Users:

In at least some implementation variations, the system comprises a system for said Provisioners to gain access to said preferences to establish or affect interactions and transactions with said Users. These interactions between the User and one or more Provisioners invoke one or more of the five senses of sight, taste, touch, hearing, smell, as well as actions that happen either in the physical or virtual environments such as transactions, commerce or other multi-party interactions.

In at least one implementation, the element is used in the "real world" environment to provide either a database lookup to the User profile preferences, or may contain within the identifier the pertinent data required in order to communicate to Provisioners the User's content and modality preferences.

In a further implementation variation, as part of, or instead of, gaining individualized User data, the Provisioners are provided with market and User data they would not have had access to otherwise, because the system communicates the all applicable preferences without requiring the User establish a User account with the Provisioner, and to contain profile and preference fields of the User's choice. Although it is possible for the User to have a relationship with the Provisioner outside of the system, it is not required or necessary. The Provisioner, simply by participating in the system, unless expressly disabled by the User, is able to provide a customer experience to that User without ever having enrolled the User in their legacy or internal systems. This may also greatly improve the Provisioner return on investment when implemented in a commerce transaction. In other words, the Provisioner can obtain profile and preference data, at the Users' discretion, without requiring the User to set up yet another online profile account and without the Provisioner having to expend time, energy and money in enrolling and managing that customer.

Further Enabling One or a Plurality of Provisioners to Use the Data at Regular Intervals to Include User Feedback During the Delivery of User Interactions and Experiences:

In at least one instance the element communicates profile and preference information via the analysis of a data-carrier or identifier/element used as a unique key to gain access to user and aggregate data. The analysis of the element communicates desired content types and modalities comprising any one or more of data, an image, an invitation, a solicitation, an offer for sale, an advertisement, a reward, a prize, a membership, a discount, a coupon, an experience, a sound file, an aural experience, a taste experience, an aromatic experience, a visual experience, a touch experience, a tangible item, a tangible substance, an interaction.

In at least one implementation of the system, Provisioners use a system-derived campaign manager as an application to aid in the development and management of the customer experience or interaction.

Advantageously, this functionality may be deployed in real-time, with aggregate or User data immediately available to Provisioners.

One possible implementation of the ability of Provisioners to receive real-time or incremental updates to User-specific or aggregate data would allow for Provisioners to update their interactions and experiences via the campaign manager or physical means in real-time, near-real-time or in incremental sessions, thereby increasing the quality of the customer experience related to the interaction, transaction or experience.

Enabling Users to Configure the Anonymity of their Identities and Profiles Based on their Own Preferences Instead of the Provisioners:

In at least one exemplary implementation variation, and application to generate a revised version of the machine- or human-readable code that either makes anonymous, or completely shields, the Users name and identity information, is envisioned. In this way, anonymity configurations include the ability to expose the recipient identity information only; and/or a combination of recipient identity with one or more elements of profile data; and/or a combination of profile data with an alias recipient identity; and/or a combination of profile data with an anonymous recipient identity; and/or to completely shield the system and providers from any recipient or identity or profile data Enabling User to Make Changes to Identities, Profiles and Preferences, Wherein the System Facilitates the Push to or Pull from Provisioners in Real-Time or Near-Real Time:

In at least some implementation variations, Users provide real-time changes to their profiles, or change their participation with a Provisioner (such as enabling or disabling the relationship), or change their anonymity settings, or provide real-time or near-real-time feedback. The purposes of these controls are to allow the User to make immediate changes to their preferences or provide data to Provisioners that will increase the quality of the Provisioner-to-User interactions.

In at least one exemplary implementation changes made by the User in the system may be pushed or pulled to participating provisioners as a means of Users to manage their interaction profile across a plurality of provisioners.

In at least one exemplary implementation, the User may push a new or revised code to their device in real-time for use in Provisioners providing real-time accommodation to individual and aggregate Users' preferences. Alternately, if the identifier anonymity status has not changed, the identifier can provide access to a changed data record without having to be regenerated.

Enabling Users to Use their System Credentials as a Federated Identity for Provisioner Portals:

In at least on exemplary implementation, the User may use the system identity to participate in Provider interactions over the web including using the User credentials to gain access to Provisioner systems. Unlike current art, the Federated system does not assign or control identity or credential data, and in this way the system credentials are used as trusted credentials regardless of if the Federated system is aware of the User's identity or profile information.

As Well as the Following Infrastructure:

Technically, this system may include, but is not limited to, the utilization of the Internet, cellular, wide area and similar networks as communications infrastructure, and the types of items received by the consumer of these systems is vastly as broad as the types of Provisioners.

The system and method also involves a system administration infrastructure for the ongoing management and reporting of the system, as well as administrative and technical interfaces into the system for use with other technologies.

Thusly, a Summary of the Exemplary System Architecture Accommodating the Above is Described Herein:

As shown in FIG. 3, the system computing environment can include, but is not limited to Internet 200 as communications medium; data center, network or cloud-computing-environment in either an open or closed implementations 205; portals utilizing a unique identifier or multiple identifiers tied to the User's individual "interaction profile" 210; Provisioner interfaces 215 as a portal to manage interaction campaigns as well as hosting software required to decode identifiers; system security using practices known to those of ordinary skill in the art, including a firewall 220, DMZ layer for security 225, an enterprise service bus and complementary security gateway 230; at least one or a plurality of database servers 232 to store and manage all data content related to identifiers, User data, Provisioner data, configurations, transactions, and content elements used in profiles or campaigns; configuration servers 234 which contain and process business logic, User and Provisioner configuration elements, as well as system configurations; application servers 236 that host the applications comprised within the system including User applications, Provisioner applications, campaign management applications, administrative applications such as those used in customer care, primary applications that combine functionalities for multiple types of stakeholders, as well as applications for reporting, auditing and billing; servers which house the core processing engines 238 related to the creation and management of multiple types and embodiments of unique identifiers to be further described, parsing systems, administration engines, Provisioner engines related to campaign management, and polling systems used to detect the presence of identifiers within an environment; application programming interface modules and software development kits 240 used for the integration of third-party systems into the system environment. The three primary User personas involved in the system are the Users 210, the Provisioners 215, and the system administration and customer care personas that directly manage the system 245. Those skilled in the art will appreciate that systems embodying the described invention need not include every element shown in FIG. 3, and that equivalents to each of the elements are intended to be included within the spirit and scope of the invention.

As used herein, marketing terminology such as "customer experience" is intended to encompass transactions that do not necessarily include a purchasing/monetary transactions, and "customer experiences" can include both "interactions" where the Provisioner directly interacts with the User, either physically or virtually, and "experiences" where the Provisioner controls the interaction with the customer, but does not interact directly. "Customer experiences" are intended to include virtually any type of physical or virtual interactions between a User and an entity.

As further described in FIG. 4, the system 250 is comprised of integrated hardware systems on both the client side as well as infrastructure, such that a plurality of devices on the client side are used to detect, read, decode, parse, and use identifiers and associated datasets may be used singularly or in combination to assemble and analyze the datasets required to deliver to Users interactions based on their aggregate or independent preferences. At least some devices include 2D and 3D reader devices 252 optimized for reading codes presented on smart phone screens; magnetic stripe reader devices 254 for reading identifiers or data from loyalty or other cards; devices that combine 2D and 3D code readers with an RFID contact or contactless reading capability 256 for reading either dense bar codes or smart chips from any physical document; detection devices used in polling for active and available identifiers within proximity of the system, including BLUETOOTH or similar proximity wireless polling hardware towers 258; RFID, wireless or similar polling hardware 260; cellular devices, smart phones or similar web services or data access portable devices 262 that are enabled to interface with systems and/or present identifiers such as 2D barcodes; commodity flatbed scanners 264 used to scan any printed identifier images or text for optical character recognition; audience or survey polling hardware 266 used in controlled environments for Users to provide input to a system; as well as browser/web-services interface devices including personal computers and other Internet or similar devices 268; as well as thin clients 270 hosted on personal computers or computing devices. Additionally, hardware and software systems including the aforementioned database servers 272, configurations server 274, application servers 276, and processing engines 278 are used to create, manage and interpret the data obtained from the client side as described earlier in FIG. 3 and to be described in greater detail in the Technology layer section of the detailed description. These systems can be hosted 280 in a variety of manner including but not limited to web hosting and application server environments 285; cloud hosting, computing and application server environments 290; as well as enterprise server environments 295, or any combination thereof.

As shown in FIG. 5, an overall functional workflow may be comprised of receiving from one or more Users 300 a new or updated profile(s) based on information and characteristics the Users want to share with the Provisioners. The system 305 then computes and generates unique identifiers and datasets for Users based on Master and/or Provisioner profile preferences. In a singular or in multiple, disparate instances, the system then detects 310 that one or more Users are present within a system-enabled environment, which can be either or both a physical environment or a virtual/IT/web environment. The system then compiles an index of participating individual Users as well as any participating Provisioners 315. Once a selection of Users and Provisioners has occurred, the system uses the associated identifiers to locate and parse profile and preference data, processes preferences and determines synergies amongst Users 320. Provisioners then use the data to provide Users 325 with customized experiences either based on aggregate or individual User data. Users with functional capabilities of providing real-time updates and or feedback 330 are then looped back into the system for either preference updates and/or feedback such as customer satisfaction.

Both the general description thus far and the following detailed descriptions provide examples and are explanatory only. Accordingly the foregoing general description and the following detailed description should not be considered to be restrictive. Further, features or variations may be provided in addition to those set forth herein. For example implementation variations may be directed to various feature combinations and sub combinations described in the detailed description or may otherwise differ in ways apparent to one of ordinary skill in the art.

Advantages of Systems and Method

Before discussing the system and figures in detail, some of the advantages of the system and methods of at least some embodiments of the invention are now discussed.

The current paradigm in customer relationship management is opt-in/opt-out systems on the Provisioners' terms where each User sets up at their discretion an independent account with each individual Provisioner. This often requires a single User to establish multiple, dozens or hundreds of online and physical identities, each with Provisioner-specific requested content;

This system flips the paradigm by putting the power of the system into the User's control by empowering them to establish one or more "consumer identities" based on the profile and preference information they desire to share, while simultaneously increasing the quality of the relationship between the Provisioner and User because the User is sharing this data willingly as well as providing insight to Provisioners regarding their preferences for modalities—or how they want to engage with the Provisioner. In general, modalities are described herein as content, matter/substance, experiences and interactions desired between Users and Provisioners, however, this definition should not be construed as a limitation.

As shown in FIG. 6, at least one embodiment allows the User to establish and manage multiple, differentiated consumer identities through a single interface. By facilitating control over modalities of content, content, matter/substance, experiences and interactions, the User is also able to control at their discretion how a Provisioner interacts with them. This system hence provides the ability for the User to regain the control of the receipt of content, matter/substance, experiences and interactions that Users have lost since the mass adoption of technology-mediated marketing. In this workflow, the system enables the User to create a profile 335 and establishes the User's ID and account information. The system adds the User 340 and allows the User to push their Master unique identifier in one or more types and methods described further in the document 345. The system stores the Master profile information 350, and then provides the User with an option to create Provisioner-specific configurations 355, which are likewise available for pushing to the User 360. Once established in the system, the User profiling data is available to Provisioners 365.

The systems described in this disclosure are non obvious and substantial additions to the body of knowledge relating to end-User based consumer profile management at least because they make extensive improvements in the areas of User anonymity and User-controlled meta profile management.

The systems described in this disclosure are also non obvious and substantial additions to the body of knowledge relating to both customer relationship management and "customer experience" by enabling for the first time substantial benefits of User profile data to deliver a customer experience without a Provisioner having enrolled the User or be aware of the person's identity or name because simply by participating as a Provisioner in the system, they are provided with either Master profile data or Provisioner-specific profile data at the User's discretion unless expressly excluded.

Provisioners also at least benefit from substantial additional innovations via access to aggregate data across multiple User profiles and multiple shared Provisioners who have not specifically enrolled in their independent customer relationship systems.

This system is unique in that the structure at least optimally provides a unified interface from which the User creates a "consumer profile" that can be shared across multiple or concurrent Provisioners in digital and physical realms as desired by the User and implemented by the Provisioner.

This system is unique in that the structure at least provides the User with customized access both virtual/digital or analog/physical customer experiences based on preferences defined by the User, and the User can change the preferences in real-time, during or prior to interaction with the Provisioner.

This system is unique in that at least the Provisioner participants gain the benefit of many Users and Provisioners' data across the system without having to establish direct relationships or data sharing capabilities with independent Users and Provisioners nor their customer relationship management systems, thereby greatly increasing the cumulative value of both the data and the relationship and affinity with both Users and other Provisioners.

This system is technology agnostic, allowing for its use within multiple platforms, (e.g. Internet, cellular, WiFi, radio, intranet or other open or closed systems) at the Users' and Provisioners' choice and depending on its ability to provide access to the targeted User or User-group/segment in a manner consistent with what content or experience is being delivered.

Additionally, this system is not required to be singular. Enabled by the architectural and modular design, multiple instances of this system may be deployed in public, open, or closed systems hosted in environments ranging from the Internet, the cloud, a single enterprise, or a hybrid environment depending only on the implementers' configuration preferences.

Advantageously, as shown in FIG. 7, optionally, the system at least provides for the anonymity 380, 385 of User personas, providing the User an additional layer of privacy while still allowing the Provisioners to create an intimate relationship, because Users have specified deep details on their profile information and modality preferences 370, 375. In this way, regardless of the fact they may not know the User's name, the Provisioner can still deliver a customized customer experience based on Users' preferences.

Advantageously, as an option, the system at least allows Users to establish a interaction profile without capturing or storing any data that would jeopardize the User identity theft. The system requires no User credit card, no security questions used by credit bureaus or other consumer data aggregation companies (e.g. mother's maiden name, city of birth, etc.) Rather, Users are given the opportunity to establish their own security question and answer for password recovery. As an extra level of security, the User may, at their discretion opt in for a security password to use with customer service to be required for any account changes made via phone with a customer care representative.

Likewise advantageously, as an option, the system at least allows Users to store credit card or banking information Users would like to be able to propagate amongst multiple Provisioners in one transaction. A use case for this type of functionality would be when a credit or debit card expires, and multiple "auto bill" Provisioners require the new, unexpired card information. Examples of "auto bill" Provisioners include Internet access companies such as Verizon, cellphone companies such as AT&T, value-added consumer services such as NetFlix and EZ-Pass, utility companies such as PG&E, gym memberships, hotel chains, and more. The User may, at their option, push a card number with associated expiry and security numbers, to those Provisioners that store the User's financial data.

Achieving customer intimacy is the ultimate desire of every Provisioner because by knowing more about stakeholders, Provisioners can create greater affinity between the User and the brand/or content. Also, Provisioners better identify and segment Users for their campaigns and give them additional levels of User insight.

In summary, at least some embodiments of the system described herein allow the User to develop, at their discretion, the emotional/affinity that Provisioner crave, because information is shared willingly with Provisioners. Simultaneously, Provisioners are better able to learn more information about their Users in a way that allows them to enhance the customer experience.

Also Provided for the Reader's Benefit are the Following Glossary of Terms. Definitions have "at Least" this Meaning, and May have Further Meanings as Described in the Context of the Narrative.

Administrator(s): Operator(s) of the total system that serves both Users and Provisioners and are responsible for system operation and/or customer care.

Biometrics: The use of personal physical characteristics in establishing a template via an algorithm to create a systematic and unique identifier for a person. Biometric engines both enroll the physical characteristic in the system, convert the resulting data into a template, and interpret and/or compare resulting templates for identification purposes.

Customer Experience: Marketing term that refers to the emotional and physical reaction a consumer experiences while interacting with another party or other entity. As used herein, marketing terminology such as "customer experience" is intended to encompass transactions that do not necessarily include a purchasing/monetary transactions, and "customer experiences" can include both "interactions" where the Provisioner directly interacts with the User, either physically or virtually, and "experiences" where the Provisioner controls the interaction with the customer, but does not interact directly. "Customer experiences" are intended to include virtually any type of physical or virtual interactions between a User and an entity.

Customer feedback or Customer Satisfaction: In the context of the system this refers to a User's ability to provide opinion data back to Provisioners in real-time.

Device: A combination of hardware device, firmware and sometimes software used by the system to read codes. Typically accompanied by a parsing engine which separates data-strings into individual artifacts. (Also parsing device, reader, code reader)

Enterprise service bus and gateway: An ESB manages commonly needed commodity services in addition to adoption, translation and routing of a client request to the appropriate answering service. The gateway provides authorizations and security as a component both inside and outside of the trusted network.

Implementation: In the context of this description, an implementation is

Instance: In the context of this description, an instance is a singular installation of a full or partial system in any environment.

Interactions—Provisioner directly interacts with User in any virtual or real-world manner.

Modality: In the context of this description, modality means the form in which an interaction is delivered, including a plurality of physical or virtual/digital forms.

Parsing engine: Codes and other machine-readable data-carriers used as identifiers, if implemented as a structured schema, require parsing processes to read the data and structure the resulting information.

Provisioner: Entity who interacts with the Users, accesses data in aggregate and on a singular bases, and then delivers content, content, matter/substance, experiences and interactions to Users. Also known as "providers".

Relational Database: A relational database associates data by using common characteristics found within the data set. Relational databases are optimized by referring to data in multiple associated tables in contrast to having multiple instances of like data in the same variable. SDK to login with the system as a Federated ID Unique identifier: A unique number, data-carrier, code, pattern, graphic, sound, associated with a User and identifiable to the Provisioner and/or the system. Users may have more than one identifier, but each identifier is unique.

User: Person or persons who interact with the system in order to configure their profile and preferences, thereby creating their unique "interaction profile" identifier which can be associated with data managed by the System. Also known as "recipients".

Detailed Specification

The "Systems and Methods to Consolidate and Communicate Profiles and Modality Preferences for Content Delivery or Interaction Experiences" will be best understood with reference to the drawings and the accompanying descriptions. Wherever appropriate the same reference numbers are used in the drawings and the following description to refer to the same elements.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

Likewise, while implementation variations of the system may be described, modifications, adaptations and other implementations are possible. For example, substitutions additions or modifications may be made to the elements illustrated in the drawings and the methods described herein may be modified by substituting reordering or adding stages to the disclosed methods. Accordingly the following detailed description does not limit the system Instead the proper scope of the system is defined by the appended claims.

As used herein, the Internet refers at least to the worldwide collection of networks and gateways that use the transmission control protocol/Internet protocol (TCP/IP) suite of protocols to communicate with one another. The World Wide Web (WWW) refers at least to the total set of inter-linked hypertext documents residing on hypertext transport protocol (HTTP) servers all around the world. As used herein, the WWW also refers at least to documents accessed on secure servers, such as HTTP servers (HTTPS), which provide for encryption and transmission through a secure port. WWW documents, which may be referred to herein as web pages, can, for example, be written in hypertext markup language (HTML). As used herein, the term "web site" refers at least to one or more related HTML documents and associated files, scripts, and databases that may be presented by an HTTP or HTTPS server on the WWW. The term "web browser" refers at least to software that lets a User view HTML documents and access files and software related to those documents.

Systems and methods in accordance with the invention can be implemented using any type of general purpose computer system, such as a personal computer (PC), laptop computer, server, workstation, personal digital assistant (PDA), mobile communications device, interconnected group of general purpose computers, and the like, running any one or more of a variety of operating systems, hosted in one or more of a variety of hosting environments, secured via one or more of a variety of security protocols, and utilizing any one or more of a variety of communications protocols. The invention can be implemented with any one or more of a variety of peripherals and devices that perform the identifier-related functions described herein.

Those skilled in the art will appreciate that systems embodying the present invention need not include every element shown, and that equivalents to each of the elements are intended to be included within the spirit and scope of the invention.

Overall System Architecture Overview—FIG. 8

The exemplary system architecture is described in a tiered, layered architecture implementation variation in FIG. 8. This exemplary system architecture, includes an Application Presentation layer 400, a Communications Layer 500, a Technology Layer 600, and an Infrastructure Layer 700 as well as a Billing and Subscription layer 780.

The system architecture is described utilizing multiple servers required to accommodate large scale adoption. Servers with similar functionality could be optimized into single or limited environments by leveraging like characteristics such that the User configuration server and the Provisioner configuration server along with the system administrator configuration server, could be hosted singularly, and duplicated for the sole purpose of backup and restoration/disaster recovery. Likewise, all the User application environments could be combined so that customer Users, Provisioner Users, as well as administrative Users of the system could access a singular server hosting these multiple applications.

Benefits would be achieved by optimizing the system across the platform via the implementation of an enterprise service bus, known to those skilled in the art, as a means of ensuring transaction-response integrity, as well as coordinating/orchestrating service mediation and load management. Also known to those skilled in the art, the implementation of a security gateway, inside the trusted network and complemented in the demilitarized zone (DMV) ensures consistent security and threat technologies and protocols.

The Exemplary Architecture as it is Shown in FIG. 8 is Further Described Thusly

The Application Presentation layer 400 includes a User interface 420, Administration interface 450, and Provisioner interface 490. The User interface 420 provides a means for a User to interact with the other layers in the system, such as via the optional Smartphone/device application 430, and includes a web/network access module 425 (which could include any known modules capable of providing Internet access, such as customized or conventional browsers), an identifier general application 425 that allows Users to configure and push to their devices their unique identifiers, and, as applicable, one or more SDK and APIs 440 for integrating third party application interfaces such as a Federated login, picture sharing or other third-party system. The Administrative interface 450 provides a means for a system administrator and/or customer care User to interact with the other layers in the system, including a customer care browser interface 455 for supporting both User and Provisioner functionalities and associated help-desk types of functions, and an Administration Access interface 460 for use in administering the system, such as running reports etc. to be described in further detail. The Provisioner interface 490 provides a means for Provisioners to interact with the other layers in the system, including a campaign management application 475 for managing their content and modality interactions with Users, a point of service client 480 for simplified processing of User identifiers, a Smartphone/device application 485 for accessing the system, an identifier parsing engine for decoding identifiers and interfacing with readers/peripherals 490, as well as one or more SDK and APIs 440 for integrating third party application interfaces, such as an advertising management module. An example API may be for a system and associated hardware for encoding identifier data onto smart chips on customer loyalty cards.

The Communications Layer 500 includes system elements known to those of ordinary skill in the art of a distributed environment architecture, and includes capabilities for distributed/Internet access 520, including but not limited to TCP/IP connectivity enabled with SSL to achieve an HTTPS secure environment 525, a firewall for the protection of the system from threats 530, and an optional VPN 535 module for use in trusted User environments such as those administered through a corporate enterprise. Also included and known to those skilled in the art is a demilitarized zone layer to host and manage a security gateway infrastructure 555 as well as a complementary enterprise service bus layer for communications layer interaction with the enterprise service bus 670 hosted inside of the trusted network, to be described further. Other optional components in the Communications layer include infrastructure for SMS messaging, as well as an integrated communications protocol to manage transactions inside of a closed system.

The Technology Layer 600 is the most complex layer of the infrastructure, providing for core intelligence and processing. It is managed and protected via an Enterprise Service Bus 670, as well as a Security Gateway 680. Three silos within the system manage computing and processing for the three fundamental stakeholders: Users, Provisioners, and System Users. The User stack includes an Identifier creation engine and storage server 604 combined with a relational database that stores User IDs and identifier data 602, a User Preferences Configuration Server 608 component that interacts with the application layer in order to facilitate the specification by Users of their preference data and to store such data 606, and a User Application Process Sever 614, that provides all of the programming foundation for the User interface, and is tied to both a Content Management database 612 as well as a transactional database 610. The Administrator stack includes the foundational System Administration Engine 620 housing the major intelligence of the overall system, a System Administrator Configuration Server 622 for configuring Administrator functions, an Identifier Parsing Engine 624 to provide one or more parsing functions for identifier types configured in the system, an Administrator Process Server 626 to house administrative processes associated with maintaining the system, and the Primary Application Server 628 which provides administrators with all User and Provisioner application functions as well as additional Administrative functions provided for in the Administrator Process Server, the Configuration Server and the System Admin engine. The Provisioner stack includes the Provisioner Engine 642 and associated Provisioner ID relational database 640 that house the fundamental intelligence for how Provisioners interact with Users through the system as well as the associated Provisioner data required. The Provisioner Configuration Server 648 interacts with the application layer in order to facilitate the configuration specifications by Provisioners and stores the associated data in a relational Provisioner database 646. The Provisioner Campaign Management and Processes Server 654 is the primary application used by Provisioners to manage their interactions with Users, and is managed through the Provisioner interface, and writes data to both a transactional database 650 as well as the content management database 652 described herein in greater detail. An optional API interface 660 provides for third-party integration of modules, such as an advertising engine, a location marketing engine or other technology that can be integrated into the customer experience. The polling system 658 is infrastructure for the automated detection and reading of identifiers as described in greater detail herein.

In this example, assuming mass adoption, due to the complexity of the data sets and the volume of Users, a secured scalable, encrypted enterprise level repository or a scalable, encrypted cloud storage environment is preferred. The encryption is key for any system not hosted in a closed environment, and if warranted by security standards may be implemented as a full PKI implementation with data accessed only with valid certificates and key pairings. The data schema of this system is also a one-to-many relational data store, necessitated by the complexity of the Provisioner demographic data storage, combined with the Provisioner profile data, each of which is associated with one Provisioner identifier.

The Infrastructure Layer 700 includes a Business Logic and Configuration Server to manage workflows and to ensure the integrity of transactions and configurations, and utilizes a relational database and look-up tables in a Business Rules Database 725. The Reporting and Audit Server 730 runs all of the transactional and logging functions and also writes to a transaction database 735. Also included are likely but optional pre-configured third party systems including an External Polling System 745, such as a satellite-based or GPS-based system provided as a third-party service, an SMS engine 750 for sending SMS messages from Provisioners to Users, a Pattern Recognition Server 755 such as what may be used in biometrics or other pattern identifier system, a Location Marketing Integration component 760 for delivery of location-based marketing or interactions, and an Advertising Engine 765 for use in pairing advertising messaging and offers to User interactions. Also included is a generic third party component not classified 740 envisioning that as technology changes, other systems are likely to be complementary to the System.

The Billing and Subscription Layer 780 associates dollar values with the business rules to determine when a revenue event has taken place, and what value and entity is associated with the event.

The servers, engines, databases and hosting and communications environments are conventional, as is known in the art, and are constructed and arranged to operate in accordance with the inventive methods and processes described herein. The architecture accommodates User interfaces, application interfaces, communications infrastructure across all levels, a core technology layer including servers, databases, and applications, as well as an enterprise service bus and gateway, and at least one infrastructure layer to accommodate logic in transactions across all layers as well as to facilitate the integration of third-party solutions. Of course, as will be appreciated by one of skill in the art, any of the servers, engines and databases and hosting and communications systems can, of course, be implemented using one or more computer systems as is illustrated in FIG. 8. Similarly the devices that interact with the system, e.g., devices and peripherals used by Users and Provisioners, can be virtually any type of device capable of interacting with the enterprise over a communications network, including but not limited to computer systems such as those in FIG. 4, including client processes running on any one or more of devices (e.g., terminal, personal computer, mainframe computer, workstation, hand-held device, electronic book, personal digital assistant, peripheral, etc.), or a software program running on a computer directly or indirectly connected or connectable in any known or later-developed manner to any type of computer network, such as the Internet.

Due to the complexity of the system and its functions, multiple hardware systems may be required to implement the system including: servers to house the processing engines and applications, servers to host multiple databases, systems used to interface with and/or administer the environment, information technology hardware required to execute communications protocols, workstations and devices required for User interfaces, and end devices and systems used to poll, identify, embed, code, decode, parse and/or read unique identifiers presented in machine-readable formats. Also, as is known in the art, the system may include environments and servers used to back up the system for redundancy.

With current advancements in application hosting and data hosting environments, it is no longer necessary for complex systems to be hosted in singular environments. The operation of the software can be consistently applied regardless of how it is hosted. Therefore, installations, databases, engines, and applications may be hosted in enterprise or cloud environments, in open or closed systems, in web services environments, or in hybrid installations. In closed or private installations, the entire system may be deployed inside the enterprise, in a private network, which is appropriate for both the scale of the implementation as well as the security requirements that are likely in a private solution. The processing, computing and hosting of the system is described herein in detail.

Optional third party solutions may be appropriate to integrate into the system at any layer in the architecture and for the purposes of this description are described as part of the detailed Infrastructure section.

The application layer described herein is based on a distributed services implementation, with a likely implementation to include web services access by a browser by multiple Users, device application interfaces to accommodate smart phones and other like devices, clients, as well as peripherals such as de-coding devices which may interface with the system in some implementation variations.

One of skill in the art will appreciate that in an alternative embodiment, the User can be a non-human entity represented by the profile.

One of skill in the art will also appreciate that in alternative embodiments, the Users can be added via processes running at either a client or server level in operable communication with the system.

Although described within a logical architectural hierarchy, any given implementation of the system may configure elements of the system in alternate layers, or may add or remove modules according to the needs of the implementation. As an example, the infrastructure layer may be moved into the technology layer and stored in the same trusted server environment, or an optional polling system may be deployed within the system versus integrated as a third party system. Also, the closed system protocol, SMS or VPN modules may not apply to a pure open cloud or Internet-based implementation. Likewise, a singular system inside an enterprise designed for a specific and limited User-base may require VPN connectivity, and may host all databases on a single server or cloud environment rather than a distributed environment. This is logical to anyone skilled in the art. The system optionally includes Software Development Kits (SDK) and Application Programming Interfaces (API) to further enhance the system.

The exemplary architecture is discussed in more detail as follows:

The Application Layer—400

The Application Layer comprises three functionality silos including the User entity system interface module 420, the administrative interface and customer care system interface module 450 and the Provisioner system interface module 490. These interface modules represent the three primary User personas associated with this implementation variation of the system.

The clients can be any entity, such as a the computer system, or specific components thereof (e.g., terminal, personal computer, mainframe computer, workstation, hand-held device, electronic book, personal digital assistant, peripheral, etc.), or a software program running on a computer directly or indirectly connected or connectable in any known or later-developed manner to any type of computer network, such as the Internet. A client may also be a notebook computer, a handheld computing device (e.g., a PDA), a mobile communications device, a smart phone, an Internet appliance, a telephone, an electronic reader device, or any other such device connectable to the computer network. A client may be operated by a system or by a User.

Module: User Interface—420

This User Interface 420 is the means by which Users create, access and manage their profile data. This architecture implementation variation is designed to accommodate a plurality of concurrent Users to system components in a distributed services environment.

Users' access to the system are controlled utilizing industry standard ID and password protocols.

Users may also use the interface as a means to login to Provisioner websites that have implemented the system API in order to facilitate a Federated login, or may use their system login credentials in participating Provisioner websites.

The User interface is customized for the functionality ease required of the end-User of the system and includes at least one of a web services enabled interface 425, a smart phone or web-enabled device interface, an applications software development kit interface and/or API 440, as well as an application specifically designed to interact with any unique identifiers associated with the User's account.

For implementations in the real world, the smart phone or device-enabled interface 430 provides all major functions of the system to the User in real-time. Embodiments for the smart phone or device interface can include web pages optimized for handheld device use, and/or may provide access to a downloadable application to be installed directly on the device, facilitating content for access by non-PC devices including smart phones, tablets, digital ebook readers, and other web-enabled and interactive and/or portable devices. This module may be deployed as a web-device-enabled interface or may be a downloadable application from one or more cellular system providers including APPLE, AT&T, SAMSUNG and others.

The unique identifiers are described further in the technology layers section. The identifier generation application User component 425 interacts as described above and allows the User to configure a unique identifier which can be stored and/or pushed to their computer or smart phone or web-enabled device for use in presentation to Provisioners.

At least minimum functionality is required for the device interface including User login, profile creation, links to update profiles, an application to generate machine- or human-readable codes or data-carriers and push them to the interfaces and devices, and the ability to log out.

An exemplary User enrollment logic flowchart is shown in FIG. 9 wherein the User establishes and configures a Master User ID and password 800, and the assigned unique Master identifier is created 805 and stored 810. If the User has existing Provisioner account 815 the User may import existing relationships 825. Either way, the User is provided with a network of participating Provisioners from which to optionally enroll 820. (IF a User does not enroll with any individual Provisioners, it's important to note that participating Provisioners will have access to the User's Master profile unless the User explicitly disables it.) One a User is enrolled with Provisioners, Provisioners are notified 835, likely batches. The User then goes on to configure preferences associated with their interaction profile 840, and that data is configured by the User configuration server and stored in the User configuration database 845, and available in real time for Provisioners to use to enable the User customer experiences and interactions. If the User does not want any codes or indicias 855, they are pushed an alpha-numeric identifier to use in key entry or other environments. If they do want indicias 855, the User is presented with options for the type of unique identifier 865, which are then assigned and stored 870, 875. The User may want to push their identifier(s) to a device 880, or not 885. If the User elects to push identifiers to their devices, this is based on business rules 890, at which time they can either navigate to a landing page, or may choose to print or otherwise download identifiers or codes 900. Once downloaded the indicias are available for download, printing, displaying on a Smartphone or wireless device screen, or transmitting in any of the forms mentioned in FIG. 4, but not limited to those forms. Thank you and landing pages are provided throughout the workflow at any time that the User has finished an element of the transaction 885, 895, 905 and 915.

As seen in FIG. 10, a web access interface interacts with the system to provide a substantive and User friendly web environment from which Users can control all of configurations of their account. FIG. 10 shows an exemplary first page in an exemplary Master profile configuration workflow and is provided for the Reader's benefit in understanding how a Master profile may be implemented.

The ability to generate real-time, machine- or human-readable codes or data-carriers is advantageous, and said codes can be stored in the system and/or pushed to the devices. This is described further in the Technology Layers.

Each User's interaction profile can be associated with multiple Provisioners with unique interfaces, as in FIG. 11, where controls can be set to override the Master profile on a Provisioner-specific basis. In this example, content and modality selections are made, and any overriding profile information is configured. Additionally, in this case, the Provisioner has provided the User with customer service contact information, the ability to link to their FACEBOOK or TWITTER accounts, as well as a means of providing customer satisfaction data by means of a slider. One skilled in the art can see that there are a multitude of options for how to configure a Provisioner-specific configuration page(s) and this example is one of a vast plurality of options for configuration.

Regardless of if the system is hosted in an open or closed environment, the User functionality herein described is required for the full benefit of the system. These unique, identifiers such as 2D or 3D barcode, or other data-carriers such as dense codes, barcode, a number, a pattern, a biometric or other unique digital or printed element which can be viewed in the User browser interface, downloaded as a file, as well as pushed to portable devices for viewing, storage and presentation to Provisioners in real-time.

The software development kit interface provides a way for third party solutions such as FACEBOOK login, TWITTER links, or accessing live chat third party customer support applications, amongst others, which can be integrated into the end User application.

Module: Administrative Interface including System Administration and Customer Care—450

Referring back to FIG. 8, The Customer Care interface 450 is a browser or web-services-type or distributed interface designed for the customer-facing system Users, and facilitates providing help desk support 455 to Users, administering email and chat support responses, as well as providing proxy transactions on behalf of the User community including Users and Provisioners. The system could be deployed in a Smartphone or web device enabled environment, however, for Administration the full benefits of the system will be best achieved using standard web access of the application via in Internet browser or similar technology 460.

At least one purpose of the customer care interface is to provide Administrator system Users with application access in order to support both the Users and Provisioners, the customer care interface must be able to access all primary functionality of the end-User systems, including the ability to create and update profiles; to create, update, store and push identifiers; to create, update, store, suspend or cancel Provisioner campaigns in a matter to be described further in this document, to parse and read individual identifiers, to generate reports, and to access such knowledge base or help content provided by User and administrator applications.

Additionally, the Administration Interfaces include an Administration Access functionality 460 for administration that can be managed via web interfaces.

Those of ordinary skill in the art will understand the concepts of the Administrator requiring all User and Provisioner functionalities as well as those functions required to manage and system and its environment.

Module: Provisioner Interface—490

This Provisioner Interface 490 is the means by which Provisioners create, access and manage their campaigns associated with the interaction profiles. This architecture implementation variation is designed to accommodate a plurality of concurrent Users to system components in a distributed services environment, and Provisioners' access to the system are controlled utilizing industry standard ID and password protocols.

The Provisioner interface module contains four component systems including the campaign management application 475, a point-of-service client 480, an identifier parsing engine 490, a smart phone, APIs and/or software development kits 495.

The campaign management application 475 is a system designed to facilitate the creation of specific campaigns, such campaigns to include the organization of an experience, an offer, multiple offers, or other interactions with Users. The campaign management application facilitates the analysis of the User population, categorizes the Users into aggregate groups, and most importantly, analyzes the modality preferences of Users to provide a framework from which the artifacts of the campaign may be designed and delivered. This application allows Provisioners access to individual and aggregated User data including the ability to download data and generate reports, as well as methods for managing a campaigns including the ability to establish an offer or multiple offers based on classifications of customer data and profiling, the ability to receive real-time data related to Users including User data that is created, updated or otherwise changed during the course of a campaign, to alter or cancel the campaign based on real-time feedback from Users, the input or upload digital content including SMS messages, digital files such as those that contain special offers and other content, the correlation to a location-marketing campaign, and the ability to deactivate, reactivate, suspend and delete campaigns.

Through this system it is possible and highly advantageous to deploy real-time aggregate User reporting. Either integrated into the system campaign manager, or a third party campaign management application, This functionality enables the Provisioner to make real-time adjustments to their campaign and associated tactics and behaviors in order to accommodate the aggregate at preferences of their User base. Highly advantageous is the ability of Provisioners to gain access to this data via a smart phone or portal device enabled interface in instances where direct customer experiences would benefit from on-site knowledge of User feedback.

It is likewise advantageous to enable Provisioners to access ad-hoc data in aggregate or by Users in real-time for the purposes of altering or measuring the campaign. This is facilitated in the Application layer and is an integrated functionality of the campaign manager application.

It is likewise desirable to enable Provisioners to configure via the system specific intervals or times to poll data. At least one implementation variation of this functionality enables Provisioners to make real-time changes to campaigns, interactions and experiences and/or to measure customer feedback in real-time during an event.

This is also the interface from which Provisioners generate their campaign activity and results reports and their transaction histories, as well as creating ad-hoc data downloads according to the Provisioner and User data parameters stored in the configuration databases. The functionality and operation of the Provisioner roles are described in greater detail in the technology section. Due to the complexity of the campaign management application, as well as its access large data sets associated with the Users, and the advantages therefore of a desktop system screen, this description of the Provisioner interface is best deployed in a web services, distributed implementation in order to provide a User friendly environment from which Provisioner campaign managers can configure their campaigns, generate and analyze reports, and otherwise interact with the system. An interface may be implemented in any aforementioned option such as handheld device or other device.

The browser must be able to access all primary functionalities of the end-User systems, including the ability to create and update profiles; to create, update, store and push identifiers; to create, update, store, suspend or cancel Provisioner campaigns in a matter to be described further in this document, to invoke applications to parse and read individual identifiers, to generate reports, and to access such knowledge base or help content provided by User and administrator applications.

Additionally, because the system allows Users to present a digital identifier to Provisioners, such as a 2D or 3D barcode, or other data-carriers such as dense codes, barcode, a number, a pattern, a biometric or other unique digital or printed element, the Provisioners require an application that allows them to interpret the identifier to access the User-oriented data associated with the User for use in enhancing their customer experience 480. If implemented as a machine-readable code or other data-carrier, two components are required for this functionality including an identifier parsing engine which is used to process and decode the data-carrier from imaging devices, as well as the code readers or other hardware devices that can read the data and make it available for use in analyzing profiles and preferences. The parsing engine may be invoked as part of the Provisioner workstation, or via a point of service client deployed in the field to poll and decode machine-readable and other identifiers, or via portable or other mobile devices with the appropriate decoding and parsing capabilities. It's important to note that for the full benefits of the system, machine-readable codes or data-carriers such as smart chips, RFID chips, machine-readable 2D or 3D barcode, or other dense codes, bar codes, or similar data-carrying technologies create a way for Provisioners to gather, analyze, and act upon Users preferences in the real world. Human readable unique identifiers may still be utilized but will typically require human data entry of the codes into the system in order to achieve the benefits of analyzing the data in aggregate.

Also, as mentioned elsewhere in the document, the data carrier may include the unique identifier, the profile and preferences, or a combination. An implementation that only embeds the identifier is best used in connected environments where the identifier is used as a unique database update. Whereas a data carrier that includes profile and modality preferences may be implemented for systems where the data carrier can be interpreted in unconnected environments, such as a free-standing workstation.

It's important to note that the schema of the identifier or code may be implemented in multiple ways, one of which is to contain key profile and preference data embedded in the code for use in unconnected environments, and another way is to include a database pointer in the code for use in querying the data repository for more information.

A Smartphone/device application 485 will allow Provisioners access to the Provisioner interface from mobile devices, in addition to providing real-time reporting on the status of User feedback as described later in the document. This module may be deployed as a web-device-enabled interface or may be a downloadable application from one or more cellular system providers including APPLE, AT&T, SAMSUNG and others.

Also included in this module is an optional interface SDK 495. The software development kit interface facilitates the integration a third party solutions into the Provisioner application including access to outside software as a service applications including customer relationship management applications, social networking, advertising services, and export/import functionalities that may be required to make best use of the data available from the system.

Referring to FIG. 12, the reader will be able to understand some of the primary functionalities of the exemplary system by reviewing the Provisioner Workflow Overview. In this exemplary workflow, a Provisioner is enrolled in the service 950 where their ID and account is established in much the same way as a User, however, in step 960 the Provisioner configures their participation in the system using Provisioner-Specific configuration options, and that data is stored 970 and the Provisioner is added to the system 980. Identifiers associated with the Provisioner are stored 990 (such as identifiers that identify the Provisioner as a system participant by encoding a link to an offers page or their corporate website, etc.) As with the User, a Provisioner may push their identifier(s) to their local system 1000 for use in Marketing 1020 or for other purposes. The Provisioner enrollment is also announced to the User base 1010. After the aforementioned configuration step 980, the Provisioner configurations are populated into the Campaign Manager based on User profiling or other configurable category 1030, at which time the Provisioner may create an interaction based on the Provisioner category 1040, or based on specific interactions with specific Users 1050. The system contains logic 1070 that identifies if the Provisioner is excluded from communicating with the User. In this way, the Provisioner does not have to manage the list, but rather can create a campaign for a segment of Users, and the system blocks the campaign 1060 from the Users that blocked interactions with the Provisioner either on the basis of the Provisioner's profile, or the content or modality type. An example may be a User who wants interactions with websites that offer women's apparel, but who has identified "adult content" as an excluded category, would not get an invitation to a lingerie trunk show in Las Vegas. Another example would be a User who signed up with AMAZON as a Provisioner, but who does not want interactions regarding streaming movies. Another example would be a User who defined in their Master profile that they do not want any email offers regardless of Provisioner, category or modality-type. Then in step 1080, the system facilitates the interaction by the Provisioner, and optionally provides Users with a means of providing real-time updates and/or feedback on the interaction 1090.

It's important to note that the schema of the identifier or code may be implemented in multiple ways, one of which is to contain key profile and preference data embedded in the code for use in unconnected environments, and another way is to include a database pointer in the code for use in querying the data repository for more information. This is described further in the document.

Additionally, it is envisioned that additional machine-readable identifiers may be added into the system configuration over time based on new or additional technologies so that the capabilities of the system are enhanced with each subsequent addition to integrated identifier types. Additionally, custom implementations of the system may add or remove what identifiers are allowed in the system based on the system owner's configuration preferences.

The Communications Layer—500

Referring back to FIG. 8, The Communications Layer 500 includes system elements known to those of ordinary skill in the art of a distributed environment architecture, and includes capabilities for distributed/Internet access 520, including but not limited to TCP/IP connectivity enabled with SSL to achieve an HTTPS secure environment 525, a firewall for the protection of the system from threats 530, and an optional VPN 535 module for use in trusted User environments such as those administered through a corporate enterprise. Also included and known to those skilled in the art is a demilitarized zone layer to host and manage a security gateway infrastructure 555 as well as a complementary enterprise service bus layer for communications layer interaction with the enterprise service bus 670 hosted inside of the trusted network, to be described further. Other optional components in the Communications layer include infrastructure for SMS messaging, as well as an integrated communications protocol to manage transactions inside of a closed system.

Module: Distributed Access/Internet—520

The Distributed Access/Internet Communications infrastructure of the system is based on current state of the art best practices and represents an implementation in a cloud or enterprise level environment which would require applications delivered to end Users via web services to be handled using common Internet protocols including but not limited to TCP IP and HTTPS, as well as firewall, and VPN technologies in order to protect the system from compromise. Also in this layer are optional components for SMS messaging from Provisioners to Users over an SMS system, as well as a module to facilitate security integration into a closed system enterprise such as single-sign-on functionality, content-blocking features or other protocols mandated by the enterprise IT system. One of many alternate implementations may provide for this system to be deployed inside an enterprise-based, closed system that would not require integrated protection from outside systems. As described earlier, technologies such as VPN are best suited in closed or proprietary installations.

It is anticipated that future art related to communications protocols would not materially impact the architecture of the system, and that advances in communications could make the system faster and/or more secure.

It's important to note that the schema of the identifier or code may be implemented so that it contains key profile and preference data embedded in the code for use in unconnected environments. While the User will require communications infrastructure to update their preferences and generate their identifier, once the identifier is generated, certain schemas would allow the decoding and parsing of the data in an unconnected environment, such as but not limited to a barcode or RFID reader or biometric interface installed on a stand-alone work station.

Module: Demilitarized Zone (DMZ)—550

The Demilitarized Zone is a best practices implementation requirement for distributed access networks. Known to those skilled in the art, the implementation of a security gateway and limited enterprise service bus in a DMZ as a complement to modules inside the trusted network ensures consistent security and threat technologies and protocols.

Module: Other Communications—570

Known to those skilled in the art, the implementation of a other optional components in the Communications layer include infrastructure for SMS messaging, as well as an integrated communications protocol to manage transactions inside of a closed system. The elements comprised in this module are flexible depending on the needs of the implementation.

The Technology Layer

The Technology Layer represents the vast majority of the of the system and contains the core hardware-hosted intelligent systems, servers, engines, and structured databases with associated data sets.

The servers can be any entity, such as a computer system, a computer platform, an adjunct to a computer or platform, or any component thereof, such as a program that can respond to requests from a client. The servers also may include a display supporting a graphical User interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

In addition, software embodying the present invention, in one embodiment, resides in an application running on the computer system. In at least one embodiment, the present invention is embodied in a computer-readable program medium usable with the general purpose computer system.

In at least one embodiment, the present invention is embodied in a data structure stored on a computer or a computer-readable program medium. The present invention also, in an embodiment, is embodied in an application programming interface (API) or a User interface. In addition, the present invention, in one embodiment, is embodied in a data structure.

The shown implementation variation utilizes a model for implementing the interaction and communication between mutually interacting software applications via an enterprise service bus and gateway. The enterprise service bus and gateway, in addition to managing the technology layer, houses and manages the security platforms. The following servers and databases may be implemented on individual servers, in shared environments, in a datacenter environment, cloud hosting or some manner of blended or hybrid environment. Additionally, the applications themselves can be hosted within the datacenter or in a cloud application or hybrid environments. Since the service bus manages the interaction and communication between the applications, the system accommodates multiple application environments.

The implementation variation shown includes three server environments for User-centric processing,

Module: Identifier Creation Engine—604

The Identifier Creation Engine and Storage Server 604 comprise the logic and applications to create a unique User identifier and identifier-related data associated with that User identifier. The creation engine writes to and reads from a relational data repository 602 that stores both the unique identifier as well as file locations for any codes, symbols or barcodes that tie to that identifier.

Once a unique identifier is created, it can be encoded into a variety of data-carrying elements including a 2D or 3D barcode, or other data-carriers such as dense codes, barcode, a number, a pattern, a biometric or other unique digital or printed element which can be viewed in the User browser interface, downloaded as a file, as well as pushed to portable devices for viewing, storage and presentation to Provisioners in real-time.

The identifier creation engine is designed to invoke multiple sub-routines, each designed to create a different kind of identifier aforementioned. In this way, the User may choose one or more types of identifiers to associated with each of their unique profiles. As an example, a User may desire a 2D barcode for general use on their phone, while wanting a QR code for a Provisioner-specific event, and a separate QR code for use at a Provisioner. These codes are stored in the User ID and Identifier database, and are pushed to the User through the processes server and the application layer and User interface.

The Identifier Creation Engine is specifically designed to be scalable and extensible, in such a way that allows for the addition of multiple sub-modules specific to types of codes. For example, one module will encode QR codes, another will encode PDF-417 2-dimentional codes, another will write data for encoding a smart-chip, while still another module configures a BLUETOOTH data stream, and another generates a alpha-numeric text string and PIN number combination. And so those with ordinary skill in the art can clearly see that a plurality of types of identifiers and codes, even those not yet invented, are easily accommodated with this modular component approach.

As mentioned earlier, a User can manage more than one interaction profile, and so the data repository is configured in a one-to-many relational database allowing infinite individual identifiers to be associated with one unique record of a specific User. The concept of the one-to-many schema enables the User to manage multiple data sets and multiple or concurrent Provisioners through their interface. One way to create an identifier schema is comprised as a hash of the combination of the User name, the web services session key and the server time stamp of initial registration. Then all related identifiers would contain that hash with a delimiter followed by the identifier number. The resultant unique identifier numbers and any remaining data, specified by the data schema, such as profile data, filenames and file locations is stored in the repository associated with that data, such profile data to include text data, file locations for images, codes or pattern graphics or any additional data associated with the unique User identifier. Provisioner-specific identifiers can likewise contain a Provisioner-specific suffix or prefix in order to identify it as a Provisioner-specific data element.

In another implementation variation, the User identifier, with or without associated data, is written to a contact chip, RFID chip or other smart chip for contact or proximity reading.

Advantageously, in another implementation variation, the unique identifiers and all relative profile data are processed and generated in real-time based on User-controlled data, and not stored after the code is presented to the User to download. The User can re-generate the codes as needed since the logic and schema remain consistent.

Any identifiers generated are available immediately after processing to the User preference server, the User application server, as well as the User and Provisioner interfaces designed to access and process the identifiers and/or codes and related data sets.

Specifically, the User identifiers may be configured to contain a database reference and pointer only, or may contain Master, Provisioner or User-specified data.

Module: User Preferences Configuration Server—608

The purpose of this User Preferences Configuration Server 608 is to enable and manage the User configurations, any related demographic and profile information, as well as User selections for modality preferences. The User preferences configuration server hosts or accesses a relational database 606 that contains the User's demographic data, their configurations, the User preferences, as well as their overall Master and Provisioner-specific configuration data.

Examples of portions of the database for User Master Profile data is shown in FIG. 13 for illustrative purposes only in aiding the Reader in understanding the likely complexity of data sets. In this exemplary and partial data set, item 1100 shows a relational data table comprised of a Master set of identifiers that combined represent pointers to elements of data within the database that constitute the data sets and records associated with a Master ID and the associated plurality of User unique identifiers. Item 1100 shows an example of a data table for a User's primary contact information. Item 1120 shows multiple tables where alternative contact information including social networking aliases may be stored in a one-to-many scenario with each User having a plurality of methods of contact, some of which would be exposed only to select Provisioners as shown previously in FIG. 11. Item 1130 refers to a data table of demographic and profiling data which can be input by the User for sharing via their Master or Provisioner-specific profiles, as is likewise with the tables shown for 1140.

The logic of this server includes the ability for a User to create a Master User configuration, and to also have a Provisioner-specific override of any Provisioner-specific data at their discretion. This means that data in the Master profile can be excluded from the Provisioner access, and/or that Provisioners may be given access to data, with the permission of the User, that is not available in the Master data set. When no Provisioner-specific preferences are configured by the User, a Provisioner receives information based on the Master configuration.

In this example, assuming mass adoption, due to the complexity of the data sets and the volume of Users combined with Provisioner-specific data, a secured, scalable, encrypted, enterprise repository helps to ensure the security of the data. The encryption is key for any system not hosted in a closed environment, and if warranted by security standards may be implemented as a full PKI implementation with data accessed only with valid certificates and key pairings. The data schema of this system is also a one-to-many relational data store, necessitated by the complexity of the User demographic data storage, combined with Master interaction profile data, and Provisioner-specific consumer profile data, each of which is associated with one User identifier which is cross-referenced to the Identifier data repository.

The User preferences configuration server makes data queries against the Provisioner configuration server to retrieve specific data fields configured by the Provisioners which will be presented to the Users for inputs and management. This functionality is described further in the section relating to the Provisioner configuration server. In one implementation variation, elements in the identifier 535 tie via the server 530 to any combination of the User's profile name/alias, email address, phone number or other contact and demographic details, along with User-specified answers to demographic and marketing questions including but not limited to age, race, sex, consumer preferences, political preferences, etc. This is also where Users specify their preferences for modalities of customer experiences. The User controls the information provided both in quantity and quality via the interface 405 into the configuration server 520.

Module: User Application Process Server—614

The User Application Process Server 614 enables and processes individual User transactions and data sets and is comprised of software logic and data processing that combines the related application and workflow screens, data forms, server and transaction processing, and related content and assembles it for communication through the communication layer for eventual presentation via the User interface. In the example implementation variation, this is achieved in an environment optimized for a web services interface. The transaction repository records incoming data calls from the User interface to the system via the communications layer, as well as outgoing data calls of assembled data which will be available to the User through the interface. Transactional data with related timestamps and server information are stored in an encrypted data repository. In this case, the server can also host or be connected to a database 610 that stores a time-stamped and detailed transaction log including but not limited to User account, time-stamp, data and other content used to provide an audit trail or to facilitate system integrity and backups. The server can also host or be connected to an application that provides management reporting to the system administrators and/or the Provisioner, such reports representative of, but not limited to, aggregated data and trending reports to assist Provisioner in analyzing their participation in the solution.

Sub-Module: Content Management Database—612

Additionally, a Content Management Database 612 stores User-specific rich content which may be configured as part of the system, such as a User profile picture, an avatar image, multiple graphical User interface skins, sound files, video files, or other digital content not part of the Provisioner-actionable User profile data.

Administrator Technologies

Those of ordinary skill in the art will understand the concepts of the Administrator requiring all User and Provisioner functionalities as well as those functions required to manage and system and its environment. Examples of some of the primary functionalities of the system follow. Due to the commodity nature of the majority of Administrative functions associated with maintaining a system, only specialized functionalities related to the successful implementation of the Invention will be described here.

Module: System Administrator Engine—620

The System Administrator Engine is a set of servers that manage the overall system and its automated processing, key back-end functionalities within the system, as well as the associated high level configuration management, hardware/software assets, client systems and system deployment tools.

Additionally, system administrator credentials, roles and permissions based on business rules are managed here.

Module: System Administrator Configuration Server—622

The System Administrator Configuration Server is where customized data sets and new business rules are tied to either the User configuration server or the Provisioner configuration server. Other special privileges such as Provisioners privileges to add ad-hoc data fields are enabled at this level. Also managed through this server is an Administrative function that allows for the specification of data fields, the configuration of reports, and the automation of certain processes required based on the implementation.

Module: Identifier Parsing Engine—624

The Identifier Parsing Engine is a set of servers and applications, configured based on allowed identifiers within the system, and housing the associated software and processing systems to identify, decode, parse and serve up identifier data to the application systems. This is where decoding devices, readers and other imaging and reading methods are enabled on a system level for use in the application level for both Users and Provisioners. The applications are likewise used by system administrators in the role of customer care, as their functionalities must match or exceed those of the Provisioners in order to provide the full benefits of the system. As new technologies for encoding and decoding become available, this is where the system, servers and applications for decoding, parsing and serving up the data would reside, complemented by the encoding software either installed here or on the identifier creation engine.

It's important to note that the schema of the identifier or code may be implemented in multiple ways, one of which is to contain key profile and preference data embedded in the code for use in unconnected environments, and another way is to include a database pointer in the code for use in querying the data repository for more information. The parsing engines would be configured to identify the schema and manner of data encoding and to appropriately decode the data.

Module: Administrator Process Server—626

The Administrator Process Server enables and processes individual customer care and administrator User transactions and data sets and is comprised of software logic and data processing that combines the related application and workflow screens, data forms, server and transaction data, and related content and assembles it for communication through the communication layer for eventual presentation via the User interface. Additionally, this process server manages the process for the maintenance of the application and interface systems, including application monitoring. This is where the system manages the presentation of system messages to the application layer for presentation in the interfaces.

The transaction repository records incoming data calls from the customer care User interface to the system via the communications layer, as well as outgoing data calls of assembled data which will be available to the customer care User through the interface. Transactional data with related timestamps and server information are stored in an encrypted data repository for all User and administrator roles and functions managed through the system.

Module: Primary Application Server—628

The Primary Application Server houses the system's primary applications and interface to the enterprise service bus and gateway. This system is responsible for configuring routing, load management, resource contention, priority resolution and integrity of messaging and data exchanges between all services to be managed by the Enterprise service bus and gateway.

Commodity network services such as event handling, queuing and sequencing are managed at this level, as well as the overall system integrity and security.

This system accesses the infrastructure layer to gain access to overall business logic and workflow rules as well as to consolidate transaction logging and auditing for the system enterprise.

This primary application server also manages system administration functionalities such as disabling the User interface sites for routine system maintenance, backup and other housekeeping functions required by any large enterprise application, including access to the help knowledgebase.

Provisioner Technologies

The Provisioner Technologies technology layer is architected in the same manner as the User technologies, with a base engine and a configuration server, with the majority of the application processes related to the actual Provisioners campaigns, and so the majority of the applications for Provisioners relate to their access to and use of the information provided by the system.

Module: The Provisioner Engine—642

The Provisioner Engine comprises the logic and application to create a unique Provisioner ID and as well as any identifier-related data associated with that Provisioner. The engine writes and reads from a relational data repository that stores both the unique identifiers, and if the Provisioner desires its own code, the system also stores any file locations for any codes, symbols or barcodes that tie to that identifier. In this example an identifier schema is comprised as a hash of the combination of the Provisioner name, the web services session key and the server time stamp of initial registration. The resultant unique identifier numbers and any associated generated filenames and file locations for codes or pattern graphics would also be stored in the repository associated with the unique Provisioner identifier. Any identifiers generated are available immediately after processing and available through the enterprise service bus and gateway as well as other servers required to interface, access or otherwise process the identifiers and/or codes and related data sets.

Module: The Provisioner Configuration Server—648

The Provisioner Configuration Server contains the vast majority of Provisioner-specified and Provisioner-generated data, and also hosts or accesses a relational database 646 that contains the demographic data, the Provisioner preferences, and any configuration data. The logic of this server includes the ability for a Provisioner to create their Provisioner profile, which can be configured to only access the User's Master profile, or can optionally be configured to allow additional configuration options.

Additionally, when a new Provisioner is added to the network, the User's receive an alert so that they can optionally configure their Provisioner preferences.

Moreover, in at least one implementation of the system the Provisioner has the ability through the system to custom configure new data fields not already part the database which are specific to their marketing needs and enables Users to enter data into these fields as part of their Provisioner-specific profile preferences. These field specifications will be added to the database schema for that Provisioner. Depending on the configuration of the system, the addition of fields to the database may constitute a revenue generating event to be tracked through system administration and recorded appropriately in the transaction data bases, including those datasets required to interact with the financial systems.

Additionally, Provisioners are given the option of making those data fields available to other Provisioners, in aggregate, which, depending on the configuration of the system, may also constitute a revenue generating event when other Provisioners opt in to access to those datasets. Additionally, the Provisioners providing custom data to be used by others in aggregate, may be configured to receive a discount against their custom database surcharges. Therefore, the ability of the system to track and report revenue events is beneficial.

FIG. 14 shows an example of a portion of the exemplary database related to Master content and modality preferences and related Provisioners that may be of interest to the User. Exemplary item 1150 shows modality preferences such as how a User wants to be interacted with. In addition to contact preferences such as calls, emails, and texting, the exemplary modalities include options for sensory interactions, allowing Users to not only specify the types of transactions or offers of interest, but also physical means of interacting with them. Examples include Users being able to specify a combination of sound, taste, touch, smell and sight preferences. As an example, a casino Provisioner with a plurality of Users would be able to customize the dining, dancing, and visual approach of their environment based on User preferences. The customer experience could be vastly different if Users preferred country dance music, a continental menu and beers, or to Users who prefer club music, spicy cuisine and mixed drinks. Further, the exemplary database allows Users to specify Areas of Interest 1160 such as auto, art galleries and museums, billiards, casinos, movies, laundry services, salon services, tanning, with the ability for the System Administrator to add to the list future categories of areas of interest. Further, the User may configure as described above, categories of Provisioners to exclude 1170 without having to configure specific Provisioners. Lastly, 1180 shows a database table with a list of Provisioners available for Users to specify preferences and thereby create for each a profile and associated unique identifier.

The Provisioner must configure its interest and access to at least one of the categories of User data, including Master data, category-specific data, and/or Provisioner-specific data, or some combination of the three. These are required fields in order to enable the business logic layer.

Additionally, when implemented as a relational database with tables to accommodate custom fields, the Provisioner may add fields not already included in User profiles for Provisioner use when interacting with subscribed Users. Authority to do so is granted in the system administrator configuration server, and Provisioner ad-hoc fields are configured through the Provisioner interface and stored in the Provisioner configuration server. An example of this may be a Provisioner in the Automotive industry, such as BMW, adding fields for types of cars owned, timeframe for purchasing a new car, budget, and own or lease options. Another example may be a Provisioner who is a sporting enterprise, such as a professional sports franchise, asking Users if they hold season tickets or are interested in special ticket offers.

When creating ad-hoc data fields, Provisioners may elect to grant access to this data in aggregate to other non-competitive (different category) Provisioners. Provisioners will only have access to User-specific data if not excluded by category or by Provisioner, but aggregate data will represent all Users as an incentive for sharing data across Provisioners.

The number and complexity of custom fields would be determined by the Provisioner's subscription/licensing level which is managed through the system administrator engine.

Module: The Provisioner Campaign Management Processes Server—654

Similar to the User application process server, this Provisioner Campaign Management Processes server 654 manages the processes and applications involving interacting with the core system via its interface to the User application layer. The applications for gaining access to the Provisioner configuration server, and all applications that must be available via the Provisioner's User interface are here, and the primary purpose of the Provisioner campaign management process server is to manage the process of Provisioners storing and scheduling communications directed at system Users, based on User singular or aggregate User preferences. The Provisioner campaign management process server manages workflow, manages content into campaigns, schedules, stores and pushes content out through the enterprise service bus and gateway and communications layer to the User interface layer.

User information is available to Provisioners assuming the Provisioner is not excluded, and the User information is based on the Provisioner-specific configuration unless the User has not specified it, which allows Provisioners access to the Master profile information.

Advantageously, the campaign management process server also generates dynamic, real-time aggregate and User-specific profiling data for use in customizing the User campaigns, and for data input into specialized real-world environments, such as a concert, rally, shopping mall, or other location where Users may congregate and where specialized systems can be adapted to provide specific customer experiences based on User or aggregate data. Real-time statistics for aggregated data including beyond the User profile, such as customer satisfaction scores, "happiness" scores, or other real-time indicators of the state of mind of the Users would be configured in the Provisioner configuration server and then tied to one or more campaigns for real-time reporting.

Additionally, the Provisioner campaign management process server sends alerts, tracks costs, generates common reports and allows for ad-hoc reporting and data export.

In one implementation variation, templates maybe provided as an optional integrated feature to ease the process of campaign design.

In another implementation variation, the campaign management process can be a third party application driven by the data available through the system Sub-Module: The Transaction Database—650

The Provisioners' Transaction Database 650 simply stores a record of all transactions conducted by the Provisioner for access in common and ad-hoc reporting.

The records in a transaction database contains sufficient information to provide an audit-quality record of each session and it's components including transactions that incur a cost, transactions where campaigns have been created, modified, suspended, or deleted; and include information such as User, session time stamps, server time stamps, as well as initiated and completed database calls, queries, and responses.

Sub-Module: The Content Management Database—652

The Provisioners' Content Management Database 652 contains associated file locations for media associated with the Provisioner account as well as any and all campaigns configured by the Provisioner. The content management database stores or refers to Provisioner-specific rich content which may be configured as part of the system, such as company logo, administrator profile pictures, multiple graphical User interface skins, a sound file, or other digital content not part of the actionable data. Within the system, each provision has their own storage location for their own content controlled through login permissions and with the capability to add or delete content as desired. And on an implementation specific basis, file locations for media can be hosted directly on a campaign management server or in an alternate third party campaign management assets location, or in alternate repository such as a cloud-based hosting environment or media server. In at least one implementation variation, Provisioners may select their own external content storage locations, which is facilitated by the technology layer API as outlined further in this document.

The types of files stored by the system include graphic files such as JPEG GIF PNG, BMP or other graphics, as well as links to web pages, actual PDF files, sound files, video files, and other rich content.

Module: Polling Application(s)—658

Real-time updates to either aggregate or individual profile information requires a polling system. Varied polling systems can be implemented to detects the existence of Users in the enabled environment and provide the system with the identifiers required to process and communicate aggregate or individual content and modality preferences to Provisioners. Examples of Polling systems include BLUETOOTH systems and an associated application, a wireless system accepting 3G and location information to triangulate the enabled Users and their locations, a proximity RFID polling application to detect the availability of Users enabled with codes, or other technologies of similar concept. Of course, this description is not limiting, and one of skill in the art will appreciate that in an alternative embodiment, other types of automated detection may be used.

Module: API—660

The Provisioners' module API is an application programming interface designed for integration of the system with third party applications and/or the use of data generated by the system to be pushed to outside systems.

One example implementation variation of the API would be to pull XML-based aggregate User profile data into thirds party applications for use in preparing campaigns, registering attendees, or other transactions. Another example of the API would be for the system owner/administrator to use the API with administrator level privileges in order to create metadata sets for analysis, system modeling or other purposes.

Another example implementation variation of the API would be the integration of a third-party content management application into the system so that it properly interacts with the business rules surrounding User profiles, exclusions and permissions.

Infrastructure Layer

Module: Business Logic and Configuration Server—720

The Business Logic and Configuration Server 720 is a business process logic and workflow engine to ensure business rules rationalization, policy integrity, workflow logic and other functionalities that impact across User, administration and Provisioner workgroups. Additionally, the business logic and configuration server is accessed by the enterprise service bus and gateway and the application servers to ensure the compliance of data exchange rules.

The business logic server is also configured to identify transactions where revenue is earned, such as a new Provisioner subscriber, a custom ad-hoc data download, a premium for real-time polling, etc. which is gathered from the User transaction database and the Provisioner transaction database, and combined with business rules to determine if a revenue event has occurred in order to send the transaction to the enterprise financial system. If the implementer of the system already has an enterprise Financial System, data can be extracted in XML or other structured data processor for synchronization and/or import into that Financial System.

The business logic server also contains configuration options for adding modifying or deleting business rules, workflows, or other configurations related to the logic of the system.

At least one business logic protocol would require that new Users are assigned a unique identifier according to the methods described herein. At least one other business logic protocol would require that the User establishes at a minimum certain data fields required in the Master profile prior to the generation of any or some unique identifier machine-readable codes or data-carriers. At least one other business logic protocol would establish that a Provisioner would only have access to User profile data after completing at a minimum certain data fields required in their Provisioner profile.

Sub-Module: The Business Rules Database(s)—725

The Business Rules Database contains the business rule rationalization and associated look-up tables, business process configuration tables, as well as any references which require a processes be mapped to data in this or other repositories in the system, and can be implemented as a third-party engine if desired.

Module: The Reporting and Audit Server—730

The Reporting and Audit Server contains configuration options for adding modifying or deleting reports, accessing raw transaction data from across the system, and configuring such reports in a pre-determined or ad-hoc basis for use in report generation, auditing, and transaction logging served up to system administrators, or Provisioners.

Sub-Module: The Transaction Database—735

The system's Transaction Database is a meta-record of every transaction conducted by the system and is implemented as an LDAP or other large scale or X.500-tye database. Every unit of work is recorded in a transaction and treated independently of other transactions. In this way, recovery from execution failures (such as a partially complete transaction) can be identified and the operations completed once the system functionality is restored. Additionally, this is the data base from which all system records from system reporting are queried and archived. The enterprise service bus communicates with the master transactional database to ensure that all transactions are completed as part of the system integrity.

Optional third-party integrated elements—(multiple 740 through 765)

Third party polling applications, SMS applications, pattern recognition applications, location marketing applications integration, and other applications can optionally be integrated into the system. A polling application, for example, would enable the system to be "aware" that enabled Users are within proximity so that User profiles could be accessed and/or aggregate data acted upon.

In at least one implementation, a polling application is used to detect the existence of Users in either a single instance, or in configured, incremental variables, for use in singular or looped processes where the system analyzes synergies across the User population in order to provide the data required to execute campaigns and/or customer experiences, and to optionally adjust those campaigns based on changes to the aggregate or individual User preferences and feedbacks. Pattern recognition applications could consist of machine-readable decoding and parsing applications available from third parties, such as pattern recognition, biometric applications such as facial recognition technologies, fingerprint matching technologies, aural pattern matching applications or the like, which are used to process markers that serve as identifiers for data and/or Users. SMS applications, advertising engines, and location-marketing applications are common third party Marketing Communications components that are often implemented as part of the total Marketing System and can optionally be integrated into Provisioner campaigns. Optional third party integration components not elsewhere classified may also be integrated into the system either on a custom basis, or leveraging the interface is available through the technology layer API.

Other commercial or commodity systems could be likewise integrated either into campaigns, or into the User interface, including commodity advertising engines such as Google AdWords and Google AdSense, FACEBOOK ads, as well as advertising proxy servers such as Doubleclick.

Billing/Subscription Layer—780

The billing and subscription layer 780 is designed to associate dollar values with the business rules to determine when a revenue event has taken place, and what value and entity is associated with the event. Throughout the system, certain transactions may be configured in the business logic layer to constitute a revenue generating event. Therefore, the system tracks and reports all transactions including those tied to revenue events, and such transactions are processed. This data can be pushed to or pulled from an enterprise billing and accounting system for the automation of subscription and service fees, or can be exported for less-automated processing. Optionally this could also be integrated with a merchant account system for credit card processing of revenue events.

DESCRIPTION SUMMARY AND RAMIFICATIONS

As those skilled in the art will recognize, the invention described herein can be modified to accommodate and/or comply with any one or more of the above-described technologies and standards. In addition, variations, modifications, and other implementations of what is described herein can occur to those of ordinary skill in the art without departing from the spirit and the scope of the invention as claimed. Further, virtually any aspect of the embodiments of the invention described herein can be implemented using software, hardware, or in a combination of hardware and software.

Thusly, the reader will see that at least one implementation variation of the System provides a system and method for Users to share with Provisioners their preferences for types and modalities of interactions, and for the Provisioners to act on the analysis of that data to create affinity with Users and increase the quality of the customer experience.

Many other variations and ramifications are possible and already envisioned, as examples:

Implementations where Users are provided a System Administrator-assigned or Provisioner-assigned profile based on one or more characteristics where the User is not provided an application for altering the data. For example, in the establishment of service tiers for a specific Provisioners.

Implementations where Users may have a combination of self-configured and system- or Provisioner-configured profiles and associated unique identifiers.

Implementations where Users are automated systems performing as a proxy on behalf of an entity or entities.

Implementations where the User provides access into the data in the online portal via an integrated Provisioner application having the Provisioner decode the identifier at point of service such as a real-world commerce transaction, or via a kiosk or other physical implementation variation versus from the User's home or workplace.

Implementations where the Provisioner decodes the unique identifier and the code contains profile and preference information without disclosing either the identifier or identity of the User. In this way, preferences are communicated with no correlation regarding the owner or unique identity of the owner of the identifier.

Implementations where the Provisioner captures, either automatically or via pattern recognition the identifier and associated data using other types of devices, such as CCTV, mobile camera, tactile or auditory device, wireless device, or other covert means, with or without the purposeful input of the User.

Implementations where the User presents an ID card/PIN number combination, or other multi-factor authentication, or physically enters their unique identifier. In this way, while the identifier may be detected by the System, the User has the ability to withhold or provide access to the data-stream via a secondary authentication process.

Implementations that include automated User and/or Provisioner billing/subscriptions 800. The goal would be to fully automate at time of interaction any transaction that results in a commerce event.

Implementations that allow the either or both User and Provisioner entities to further leverage location-based technologies available in cellular and similar technologies to further enhance the customer experience beyond the core solution.

Implementations that allow the User to make anonymous their true identity and instead optionally present an alias, including but not limited to the ability of the User to make their identity anonymous to the System in addition to Provisioners.

Implementations that allow the User to alter or disable the relationship with the provisoner through the use of the system. Once a User has a tie to the Provisioner, the User may want to disable, suspend or delete the relationship with the Provisioner, including any secondary relationships such as integrated Provisioner solutions, including but not limited to CRM systems, the Provisioner's Opt In/Opt Out systems or other contact or content management systems. An implementation variation that allows the User to control all Provisioner parameters through the System, using the System as a proxy, is specifically envisioned.

Implementations that allow the User to create one unifying profile that has one or more sub-profiles not specific to Provisioners but instead specific to classes of Provisioners, so that different preferences can be shared with different types of Provisioners (e.g. an "adult" persona for the access of age-restricted content or User experiences, versus an alternate "shopping" persona for the acquisition of commodity goods and services.)

Implementations that allow the User to leverage alternate, existing identifying technologies (e.g. optical character recognition, biometrics, digital watermarks, voice pattern, audio or other technology) either singly or in combination to establish and communicate their unique identity.

Implementations where the system is deployed over a combination of Internet, cellular, intranet 110, closed, stand-alone or other systems combinations, often depending on access to the targeted User group.

Implementations where the system is hosted in whole or in part in a cloud environment is specifically envisioned, including Implementations where different modules of the system are hosted in separate environments, such as the combination of hosted servers, cloud computing, Provisioner enterprise, and local storage, with and without clients.

Implementations where the communications and data processing may be synchronous or asynchronous, depending on the type of request and method and time required for the system to respond.

Implementations where the code readers are in an unconnected environment and instead of pulling data from a repository in real-time, decode specific profile data from the code itself Implementations where the User profile data is hosted in multiple or disparate environments.

Implementations where the Provisioner system and data is hosted in multiple or disparate environments.

Implementations where the overall system or elements of the system and data are in separate environments, including but not limited to portions of the system being integrated with third-party systems such as a campaign management or customer contact system, or other.

Implementations that allow the Provisioner to implement the solution within their enterprise or in a combination of hosted services plus their enterprise.

Implementations that allow for the Provisioner to establish its own identifier(s) or an in-house system to be shared with the User.

Implementations that allow the User to store locally his/her profile information in addition to or instead of in the core system.

Implementations with varying levels of physical and logical security.

Implementations where the system may not require a User but may provide the benefits of the system to groups or members with the same profile.

Implementations where all or some of the System activities are automated without the requirement of Users, Provisioners or Administrators to interface directly with the System.

Implementations where Users are presented with default preferences as a starting point for their User data.

Implementations where Provisioners can access raw data and generate customized reports or have access to detailed log files.

Implementations where the User can associate their profile with an eWallet to facilitate online or cellular transactions.

Implementations that include the ability for Users to participate in social networking, either by creating a new social network within the system, or by allowing Users to associate their profile or activity with existing social networks.

Implementations where the User profile information can be pre-populated into online portals via the use of technologies related to auto-fill widget-type utilities embedded in a web browser.

Implementations with varying levels of physical and logical security,

Implementations wherein Users define their own data-fields, or data types.

Implementations where Provisioners integrate their own campaign management system, Illustrative Nature of Description It should be understood that, in the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular User needs. Moreover, the steps of the disclosed methods may be modified in any manner, including by reordering steps and/or inserting or deleting steps, without departing from the principles of the invention.

It also should be noted that the previous illustrations, together with the accompanying descriptions, are provided by way of example only and are not limiting. Those skilled in the art will recognize that many different designs of architectures, data sets, workflows, interfaces, screen shots, navigation patterns, and the like, are within the spirit and scope of the invention. It should also be appreciated that the flow diagrams do not depict the syntax of any particular programming language. Rather, the diagrams illustrate the functional information one of ordinary skill in the art requires to fabricate generate and configure software and hardware to perform the processing. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit and scope of the invention.

Moreover, computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or browser software.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed.

Illustrative Examples Detailing Multiple Concepts of Operations for Several Exemplary Embodiments Due to the complex, multi-faceted nature of the system, the following examples of concepts of operations are provided in order to facilitate the Reader's understanding of the system and its flexibility in scope and configuration. None of these examples is to be considered limiting to the invention, and those skilled in the art will understand the applicability of these and other scenarios to the exemplary system described in the Detailed Description section.

Illustrative Examples Detailing a Concept of Operations

Example 1

Unique Experiences to Two Users in the Same Environment

This concept of operations is provided in order to more fully illustrate an example of how this system may be implemented by both multiple Users and multiple or concurrent Provisioners in order to achieve a highly-targeted, highly-desired customer experience that creates greater affinity with a variety of Provisioners.

FIG. 15 shows multiple Provisioner interactions with multiple Users. Item 1200 starts by detecting that Users are physically present within a system-enabled environment, and then detecting which Provisioners and Users are present, and pulling together their unique identifiers to be analyzed 1220. Synergies regarding User profiles, including the modality preferences, category exclusions, areas of interest and Provisioner configurations are computed and processed by the system 1230 across multiple Provisioners. Once synergies are determined, the data is fed into two sub-systems, an aggregated profiling utility 1240, and/or the campaign managers for every participating Provisioner 1250. For the aggregated data set, the data is made available for Provisioners through their system interface 1270. For Provisioners who configure campaigns, first the system pulls offers or interactions for excluded Provisioners 1260, and then facilitates the interaction between the Provisioners and Users via the Modality preferences 1280 and optionally provides the Users a way to provide real-time updates and or feedback on the interaction 1290.

To further show this concept, a notional concept of operations is provided, utilizing two Users and eight Provisioners at a political rally, however a plurality of Provisioners and a plurality of Users is easily accommodated based on the exemplary embodiment.

In one aspect of the system, User A and User B go to Washington, D.C. together to attend a political rally, one possible type of system-enabled environment. Multiple Provisioners who are participating in the event are polling the attendees for identifiers. The political identity that User A has configured and activated identifies User A as a Republican, and User A has indicated that he/she will accept political-related emails and has also configured an email account for messages to be sent to. User A did this 2 years ago in his/her Master configuration. User A may or may not have updated the configuration as time progressed.

The system analyzes the User population, categorizes them for aggregate reporting and also analyses the modality preferences and User profile preferences of Users on behalf of multiple or concurrent Provisioners that may or may not have individual profiles from each User. The system then calls on the Provisioners individual campaigns and the content stored therein and unless specifically excluded to interact with Users based on the User preferences.

User A receives a welcome email immediately on his/her smart phone.

During the rally User A is sent links from Provisioner D to his/her smart phone to facilitate the upload of videos to the event media website. User A also received a tweet from Provisioner E, the frontrunner Republican's TWITTER account because User A has authorized that as well. User A's tweets amongst a hundred others is being streamed by Provisioner F, a major news network in real-time and is being broadcast on the monster boards at the rally by Provisioner C, the event organizer.

After User A leaves the event, he/she receives a thank you email with a link to donate to an allied cause that aligns to Provisioner G that focuses on charities related to veterans, one of his/her interest areas from his/her User profile. User A continues to receive digital content from the Provisioners until User A choose to deactivate them.

User A never had to register, or sign anything, or set up anything at the rally. User A simply showed up and made known in his/her profile what content and modalities are of interest.

The impact of User profile configurations can be understood when combined with a Provisioner campaign. In this example, User B, also identified through polling, 103, configured his/her identity differently. User B is an Independent. User B hates email but loves to get physical items in the mail, and is willing to connect on FACEBOOK. User B's experience is therefore is different. User B doesn't get the welcome email or the links to upload videos. User B has a different experience as he/she gets a FACEBOOK invitation from a new Tea Party candidate, Provisioner H, as well as the keynote speaker, Provisioner I, at the event who is a Republican who is trying to get swing votes.

A week later, User B gets a direct mail piece in the mail with a letter from his/her favorite candidate, Provisioner J, and gets a post card a week later from the key note speaker who is Provisioner I.

User A and User B attended the same event at the same time and sat next to one another for four hours and had two different customer experiences both during and after the event/moment in time.

Illustrative Examples Detailing a Concept of Operations

Example 2

Real-time Update requiring a System

Far superior results to any CRM or interaction profile solution, the system, in real-time, allows the User to alter their data at any time. Unlike customer profiles based on an email address or phone number as an identity linking to a Provisioners' CRM database, the system provides a unique identifier that facilitates demographic and modality information from the system in real-time, thereby allowing the User to alter via their smart phone, iPad, customer service call or other system-connected means, their profile. Examples of alterations to the profile may be: changing one's profile to be "anonymous" prior to visiting a new car lot to look at new cars, or changing one's preferences for TWITTER connectivity prior to or during a large concert. A User could expose their birth date to receive a free dessert at a cafe, and immediately make it anonymous after leaving the restaurant. The User may input and update customer feedback information or customer feedback in real time for polling by the Provisioner. Additionally, once a User has entered a system enabled environment and been identified, the Provisioner knows that it can continue to poll that User, either individually or via aggregation, until the User removes the permission to do so by either shielding their identity, deactivating the code that was polled, or disabling or altering the Provisioner's permissions.

From reviewing previous FIG. 5, the looped process of Users updating their profile through system analysis step 320 enables the system to repeatedly update the data presented to Provisioners for use in managing interactions with Users.

As an illustrative example, FIG. 16(*a*) shows a mobile device application screen that provides a real-time profile update capability, where the User can turn off all identities as if they were not a system participant 1300, or can retain preferences, however shield their identity 1305. They may update their Master or Provisioner profiles in real-time 1310 and may find nearby Provisioners 1320 via location marketing or a GPS-enabled system such as AROUND ME or YELP. When ready to use an identifier, i.e. a QR code to be used for a drink discount offer, as but one example of a machine readable code, the User can generate the code in real-time via the app 1340. The identifier may contain a combination of the unique identifier code plus any or all User preferences embedded within the code, or it may contain only the unique User identifier which is then used by the system to identify the User profile to query. A person having ordinary skill in the art will recognize that the code may be a record locator or a more sophisticated data-carrier containing more detailed User data.

The User can also check into a location, which notifies the Provisioners' polling application and database 1360, and optionally social apps that allow this function, such as FACEBOOK checking, or may select to turn off the stealth mode via, in this instance, a "see me" type button 1370 that reactivates the profile.

In this instance, when a code is pushed to the phone, via 1340, then loads on the screen FIG. 16(*b*) 1350 for use by Provisioners in obtaining profile data, either directly from the code or via access to the centralized system based on permissions.

Illustrative Examples Detailing a Concept of Operations

Example 3

Provisioners Changing the Overall Consumer Environment Based on Changes in Aggregate Data In one aspect of the system, Provisioners may elect to receive aggregate data based upon the combined profiling of all enabled Users in an environment, and to use that aggregated data to affect the overall customer experience.

Figure 17:
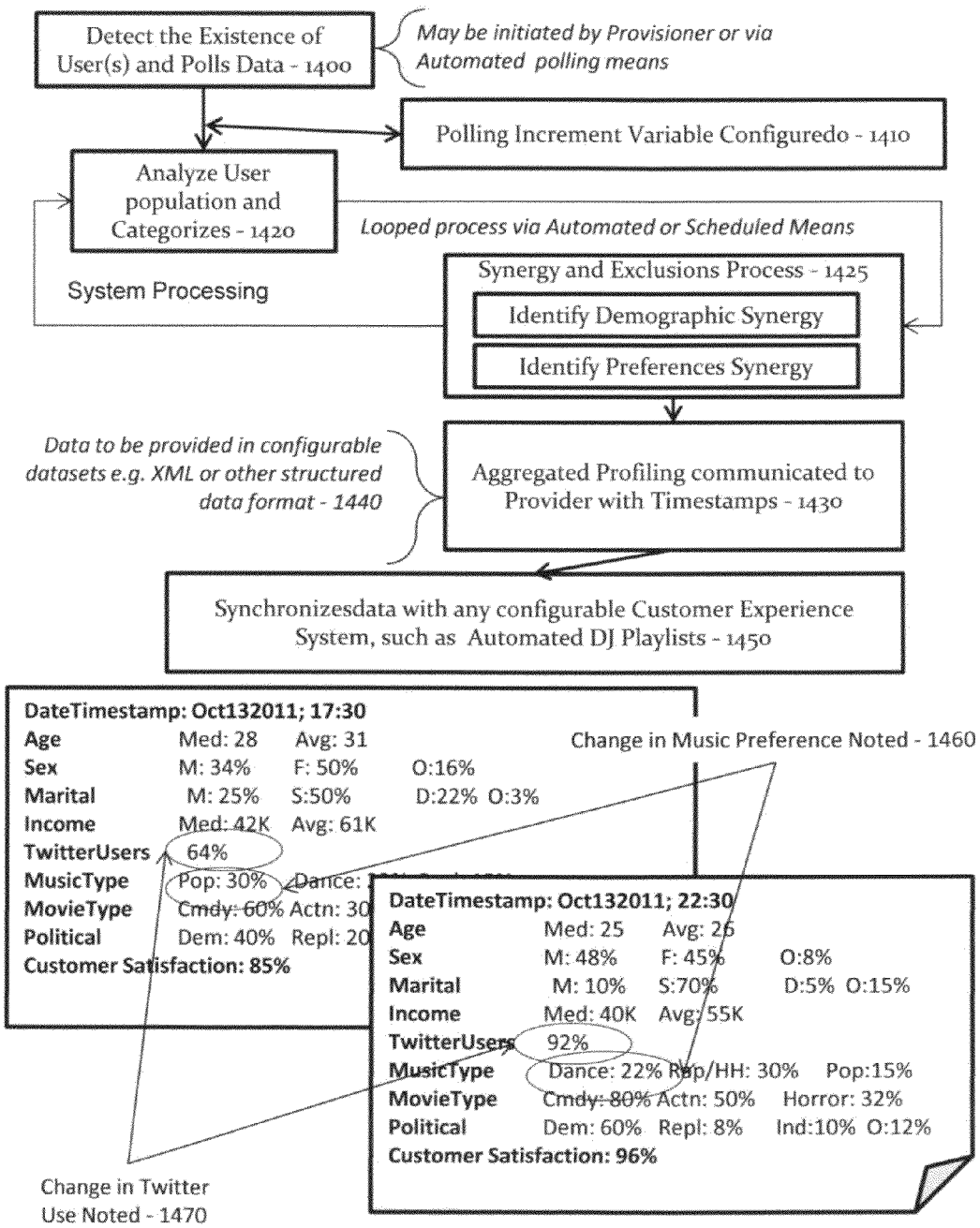
FIG. 17 is Single Provisioner, Multi-User Single Event with Aggregate Real Time Reporting, in accordance with an embodiment of the invention.

As shown in FIG. 17, the system polls the User population 1400 using their enterprise WiFi or BLUETOOTH environment to identify Users transmitting their existence as participants in the system via, in this example, WiFi/location technologies or BLUE TOOTH or other similar wired or wireless technologies. Note that those with ordinary skill in the art will recognize the these are but a few of many data-carrying options that do not require a barcode or similar identifier. Likewise, a combination of a cellular network and GPS combined with movement sensors on individual smart-phones configured with an application similar to the iPhone BUMP application, could be used to transmit the User identifier to the system.

In real-time or at specified intervals 1410 the system then processes the User participants to identify aggregate profile characteristics 1420, such as age, sex, or any other preferences of interest to the Provisioner, and the Provisioner is then able via manual or automated means to modify the customer experience to fit the profile of those present.

Figure 18:
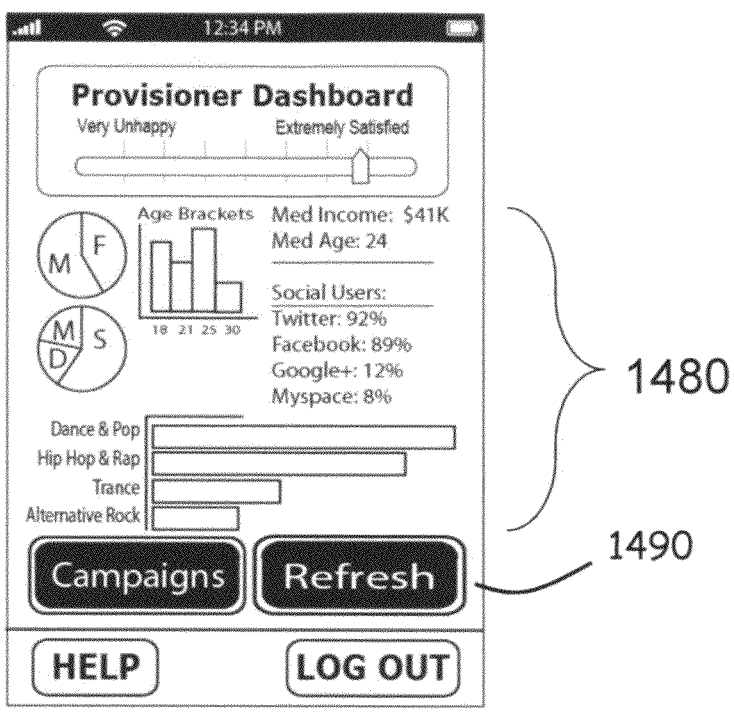
FIG. 18 is Provisioner Dashboard In Real Time via Mobile Device, in accordance with an embodiment of the invention.
Figure 18:
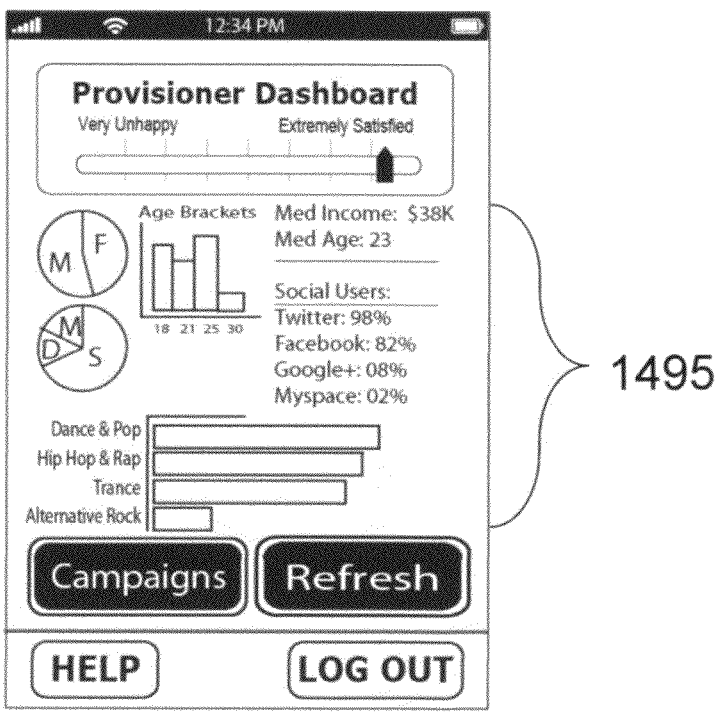

An Example of this capability could include a night club polling Users for age and musical preferences and adapting the DJ playlist based on the combined preferences of the majority of the Users present. FIG. 18(*a*) shows a real-time hand-held "dashboard" report of Provisioner self-selected indicators 1480 which can be analyzed and presented to the Provisioner for use in decision-making or automating changes in real-time to the environment.

As described previously in FIG. 17, item 1430, there is a process step for obtaining aggregate data in datasets 1440 for use in 1450 automating changes to the customer interactions. This interface takes the results of that process and displays it for the Provisioner use.

Of critical importance in this concept of operations is the concept of the "Refresh" button 1490, which allows Provisioners to run the aggregate data query again and to see the changes to the aggregate User characteristics 1495 that allow the Provisioner to make changes to the customer experience. In this scenario, the Provisioner is a nightclub, and they alter the drink specials and the music play lists as well as their social media campaigns and posts in real time based on the changes in their User demographics as the night progresses. Note the changes in the aggregated data report in item 1480 versus FIG. 18(*b*) 1495.

Another example may be an amusement park identifying that there is a crowd forming at a particular ride using that information to push via SMS a message to Users of rides that aren't backed up, or using the reporting function to determine that they should send out performers to provide a temporary distraction a few hundred yards away so that the density of the crowd at the ride can be lessened.

Illustrative Examples Detailing a Concept of Operations

Example 4

Parental Controls Over the Online Identity of Children Through a Federated Proxy Login Credential In one aspect of the system, parents may configure an child's profile as a proxy, thereby having significant control over Provisioners access to data about the child. As an example implementation, Provisioners may implement a federated login feature in their site to accept the child system identities as a login, and in this way, the Provisioner is not exposed to the child's name or other information that children sometimes provide naively. The Provisioner gets the benefit of the User using their system, while the parents have complete control over what information the Provisioner has about their child. In this way, parents may allow children to establish online accounts that use this profile that identifies them as a child with appropriate content and modality preferences. This even enables one child User with a parental proxy to have multiple identifiers and multiple profiles and modality preferences, such that a DISNEY profile may differ from the child's Master profile, or a parent may activate or deactivate the Master or Provisioner profiles as desired in order to control the child's customer experiences.

Illustrative Examples Detailing a Concept of Operations

Example 5

Users Controlling their Online Identity, Profiles and Modality Preferences in a Web Environment In one aspect of the system, if deployed in a Federated login environment, where system User login credentials are used across multiple or concurrent Provisioners' online services, a User may configure their Master or Provisioner profiles to gain significant control over Provisioners access to profile data. The User shares with the Provisioner(s) what data they are interested in sharing, versus Provisioners making certain data fields "required" in order to obtain login credentials to the system. While the Provisioner may not gain access to initial desired profile information, the Provisioner may gain access to profile information of interest. For example, if a Provisioner discovers through reporting that the profile of their User has changed from a predominantly female population in the 30-year-old bracket to a predominantly male population in the 25-year-old bracket, it can alter the imagery and text provided on the webpage to be of more interest to the changing population. If the system reports that a specific 19-year-old male has an interest in action movies, even if this is an apparel web property, a web page content engine could be altered to present him with an advertisement for a new line of action movie figures, or apparel tied to the latest action film.

To go another level deeper, if in aggregate the system identifies certain content preferences, such as a spike in Users interested in purchasing a car in the next 6 months (even if this is an electronics or news site) the Provisioner may configure it's advertising services engine to alter the third party advertisements, such as banners, hosted on the site. This level of consumer insight beyond the types of profile data a web asset may typically request during User sign-up provides significant marketing and profiling insights not available with any current systems.

Not only does the Provisioner gain more insight into its customers, the Provisioners stakeholders such as third party advertisers or merchandise licensors gain increased sales through their channel. The User is served with information and offers of interest to them and therefore gain affinity for the Provisioner due to the enhanced customer experience; the Provisioner makes more sales because they have piqued the interest of the User; and the Provisioner's stakeholders have increased affinity for the Provisioner who gains them better results because of their ability to adapt to the changing requirements and interests of Users.

Illustrative Examples Detailing a Concept of Operations

Example 6

Closed System Tied to a Closed Population, Combined with Users with Pre-Enrolled Profiles Tied to Tiered Service Levels In one aspect of the system, a Provisioner may elect to implement its own instance of the solution in a closed IT environment, thereby assuming control over all components of the system and all levels of the architecture. This is advantageous in an environment that requires highly custom configurations, business rules or workflow procedures beyond the current state of the open system, and/or requires that the Users and personnel that touch the system have sufficient permissions and configuration control to use the system. It is also appropriate when the solution requires absolute assurance that applications and equipment are secured against the introduction of malicious programming that are possible in open systems.

In this example, a closed system could be used by an entity such as the Olympic Committee that provides both a large volume of Users (event ticket holders) as well as a large constituency of Provisioners (Olympic sponsors). Additionally, business rationale for participating the Olympics is to create affinity across all stakeholders, from the athletes, to ticket holders, to country representatives, to the sponsors and even member organizations of the Olympic Committee itself.

In at least one implementation variation of an instance of the system, a custom set of business rules and configurations would enable the system administrator to establish pre-defined User tiers with distinct permission sets or functionality levels. Using the Olympics as an example, athletes may be given one configuration, while the highest tier ticket holders are given another, and specific event ticket holders another, and so on.

In this way, Users are provided with promotions, permissions and other customized elements of the customer experience based not just on their profile, but based on their role and permissions within the system. In this context, the User profiles may be created entirely by the system implementer directly, and may or may not provide Users with a means for updating the profile.

Advantageously, the ability of system administrators to pre-enroll Users based on tiers, where identifiers were categorized into corresponding User tiers, with a corresponding User interface specific to their role in the system, and permissions and profiles defined accordingly, and if Users are given permissions to update their profiles, would provide additional control and User benefits beyond a commodity or mass adoption instance.

Illustrative Examples Detailing a Concept of Operations

Example 7, 8 and 9

Multiple Combinations of User and Provisioner Interactions Based on "one-to-many" and "many-to-one" and "many-to-many" Scenarios FIG. 19 is a flow chart showing a process flow between at least two Users and a single Provisioner FIG. 20 is a flow chart showing a process flow between a single User and multiple Provisioners based on a User's stated Provisioner preferences FIG. 21 is a flow chart showing a process flow similar to FIG. 15 however is described as a singular Provisioner with multiple Users utilizing both aggregate and individual User campaigns.

Of course, using these as general guidelines, a person of ordinary skill in the art would be able to configure multiple scenarios depending on the desired implementation.

FIG. 22 shows examples of codes that may be used as identifiers for ease in the Reader's understanding of the art. Item 1800 is an example QR code. Item 1805 is an example DATA MATRIX code. Item 1806 is an example barcode. Item 1807 is a sample alpha-numeric data string. A person of ordinary skill in the art would be able to configure multiple types of data carriers not easily represented on paper, such as alpha-numeric or binary codes transmitted wirelessly, BLUETOOTH or other wireless data streams, digital and covert watermarks, and other unique identifiers which can be embedded or transmitted as part of a User transaction or a Provisioner interaction.

Alternative Embodiments

Although some implementation variations are shown to include certain features, the Inventor specifically contemplates that any feature disclosed herein may be used together or in combination with any other feature on any implementation variation of the system. It is also contemplated that any feature may be excluded from, or combined with, any implementation variation of an system. Many variations of the system will occur to those skilled in the art.

As an example, an embodiment may be developed that requires no system administration and is instead a direct implementation between Provisioners and Users.

Another example would be an embodiment where the system facilitates an interaction between two or more virtual entities versus a business-to-consumer or a business-to-business transaction or interaction. Whereas a Provisioner may be a system that desires to interaction with another system, where the second system controls in what form the interaction is accepted, and where such controls are communicated in a unique identifier.

What is claimed is:

1. A system for managing virtual and physical world interactions and transactions between two entities as a platform system, the system comprising:
    at least one provider, the provider configured to provide at least one of an interaction and a transaction;
    a communications layer configured to provide at least one of an interaction and a transaction to at least one recipient, wherein the interaction or transaction comprises providing the recipient with the ability to specify at least one combination of preferences, the preferences selected from the group consisting of sound, taste, touch, smell and sight preferences, as well providing as actions capable of happening in at least one of a physical environment and a virtual environment;
    the platform system storing recipient-defined identity and preferences data, the platform system configured to:;
    process and analyze recipient data and store said data in records tied to the recipient identity;
    process and analyze recipient data to identify synergies in aggregate groupings of recipient data;
    provide to the recipient control over the access to said recipient data via the at least one provider;
    enable the recipient to change its identity and preferences data in real-time via access to the platform data; and
    notify the provider of changes to identity and preference data of the recipient.

2. The system according to claim 1, wherein the recipient identity and preferences data is tied to at least one of a plurality of identity records via a database structure, wherein the system is further configured to implement the unordered steps of:
    indexing the record(s) associated with the recipient data according to a unique identifier, wherein the unique identifier is provided in at least one of plain text, visual matter, machine-readable code; machine readable code provided on a toke, and in a data-carrying device;
    configuring the unique identifiers as a key for the provider to retrieve profile data from the recipient;
    analyzing the data retrieved by the system, in whole or in part, for the provider to use as information required to deliver to the recipient at least one of an interaction and a transaction, wherein the delivery of the at least one of the interaction and transaction is accomplished in at least partial synergy with at least one recipient preference.

3. The system of claim 1, wherein the system is further configured to implement the unordered steps of:
    if an aggregated data demonstrates at least one synergy or at least one substantially common preference amongst a plurality of recipients, enabling the provider to use the aggregated data to customize at least one of an interaction and a transaction between the provider and recipient, such interactions and transactions comprising of at least one of or a plurality of data, an image, an invitation, a solicitation, an offer for sale, an advertisement, a reward, a prize, a membership, a discount, a coupon, an experience, a sound file, an aural experience, a taste experience, an aromatic experience, a visual experience, a touch experience, a tangible item, a tangible substance, interaction, a physical experience, a virtual experience or interaction; and
    permitting the provider to access, at least periodically, at least one update to a consolidated recipient preference profile;
    providing the analyzed data to at least one provisioner to enable the provisioner to configure a recipient campaign, e.g. via a an organized campaign management utility or function.

4. The system of the method of claim 1, wherein the system is further configured to implement the unordered steps of:
    configuring recipient-specific data to enable at least one provider to use the data to customize at least one of an interaction and a transaction with the user;

permitting the provider to access updated data at least periodically, the updated data comprising at least one of changes or updates to consolidated recipient preference profiles.

5. The system according to claim 1 wherein the system is further configured to:
enable the recipient to configure the recipient's corresponding identity in one or more anonymity configurations, wherein said anonymity configurations include the ability to provide to at least one entity expose the recipient identity information of the user, wherein the recipient identification information comprises at least one of:
recipient identity information only;
a combination of recipient identity with one or more elements of profile data;
a combination of profile data with an alias recipient identity; and
a combination of profile data with an anonymous recipient identity;
complete shielding of the system and the provider from any recipient or identity or profile data;
enabling the recipient to control said anonymity configurations;
wherein the recipient may have one or more datasets of the combination of identities and preference data;
wherein the recipient is enabled to update anonymity settings in real-time.

6. The system of claim 1 wherein the relationship between the recipient and the provisioner is established and managed by the system, wherein the system is configured to enable the recipient to make at least single additions or changes to the system profile and configuration data, wherein the new or changed data is applicable to at least one provider;
the system is configured to enable the recipient to push the resulting data to at least one provider via the system;
wherein, based on the configuration of the provider within the recipients preferences configuration, the system is configured to allow the recipient to allow providers to pull all of some data from the system.

7. The system of claim 5,
wherein the system is further configured to enable the recipient is to use said identity to participate in provider interactions via a Federated Identity system, including using the recipient credentials to gain access to provider systems.

8. The system of claim 1, wherein the system comprises a plurality of providers.

9. The system of claim 1, wherein the communication layer is configure to provide at least one of an interaction and a transaction to a plurality of recipients.

10. The system of claim 2, wherein the system comprises a plurality of providers and the is configured to interact with a plurality of recipients.

11. The system of claim 3, wherein the data included in a consolidated recipient reference profile further comprises at least one element of customer feedback data.

12. The system of claim 4, wherein the data included in a consolidated recipient reference profile further comprises at least one element of customer feedback data.

* * * * *